United States Patent [19]
Gonzaga

[11] Patent Number: 6,109,327
[45] Date of Patent: Aug. 29, 2000

[54] TIRE CHANGING MACHINE

[75] Inventor: Tullio Gonzaga, Via Canolo, Italy

[73] Assignee: Butler Engineering & Marketing S.r.l., Rio Saliceto, Italy

[21] Appl. No.: 08/954,751

[22] Filed: Oct. 20, 1997

[30] Foreign Application Priority Data

Oct. 22, 1996 [IT] Italy .................................. VR96A0090

[51] Int. Cl.⁷ ............................................. B60C 25/128
[52] U.S. Cl. ......................................................... 157/1.28
[58] Field of Search .................... 157/1.17, 1.2, 157/1.22, 1.26, 1.28, 18

[56] References Cited

U.S. PATENT DOCUMENTS

| | | | |
|---|---|---|---|
| 3,807,477 | 4/1974 | Curtis ....................................... | 157/1.28 |
| 3,827,474 | 8/1974 | Besuden ................................... | 157/1.28 |
| 3,958,618 | 5/1976 | Reuther . | |
| 4,039,016 | 8/1977 | Cunningham ........................... | 157/1.28 |
| 4,047,553 | 9/1977 | Kotila ...................................... | 157/1.24 |
| 4,168,733 | 9/1979 | Gwaltney ................................ | 157/1.28 |
| 4,222,426 | 9/1980 | Brosene, Jr. ............................ | 157/1.28 |
| 4,335,772 | 6/1982 | Bubik et al. ............................ | 157/1.28 |
| 4,632,167 | 12/1986 | Collins .................................... | 157/1.28 |
| 5,244,029 | 9/1993 | Schoen et al. .......................... | 157/1.17 |
| 5,758,703 | 6/1998 | Mimura ................................... | 157/1.28 |

FOREIGN PATENT DOCUMENTS 0 448 042  9/1991  European Pat. Off. .

*Primary Examiner*—Timothy V. Eley
*Assistant Examiner*—Dung Van Nguyen
*Attorney, Agent, or Firm*—Guido Modiano; Albert Josif; Daniel O'Byrne

[57] ABSTRACT

A tire changing machine which comprises: a bed, a frustoconical platform which is supported by the bed and is designed to act as a support for a wheel rim, a hollow shaft which is coaxial to, and rotates rigidly with, the frustoconical platform and raises from said platform and is provided with a threaded portion, a fixed shaft which is arranged within said hollow shaft and protrudes therefrom, securing means scewable onto the hollow shaft for fixing the wheel rim on the platform, a lateral column raising from the said bed, upper bead breaking means carried by the said column and arranged to act from above on a tire on a wheel rim located on the frustoconical platform, lower bead breaking means arranged to act from below on the lower side of a tire on a whell rim placed on the platform, a driving motor for rotating the said frustoconical platform about the said hollow shaft, and automatic locking and releasing means between the said driving motor and said platform to safely clamp the platform against a wheel rim placed thereon.

66 Claims, 14 Drawing Sheets

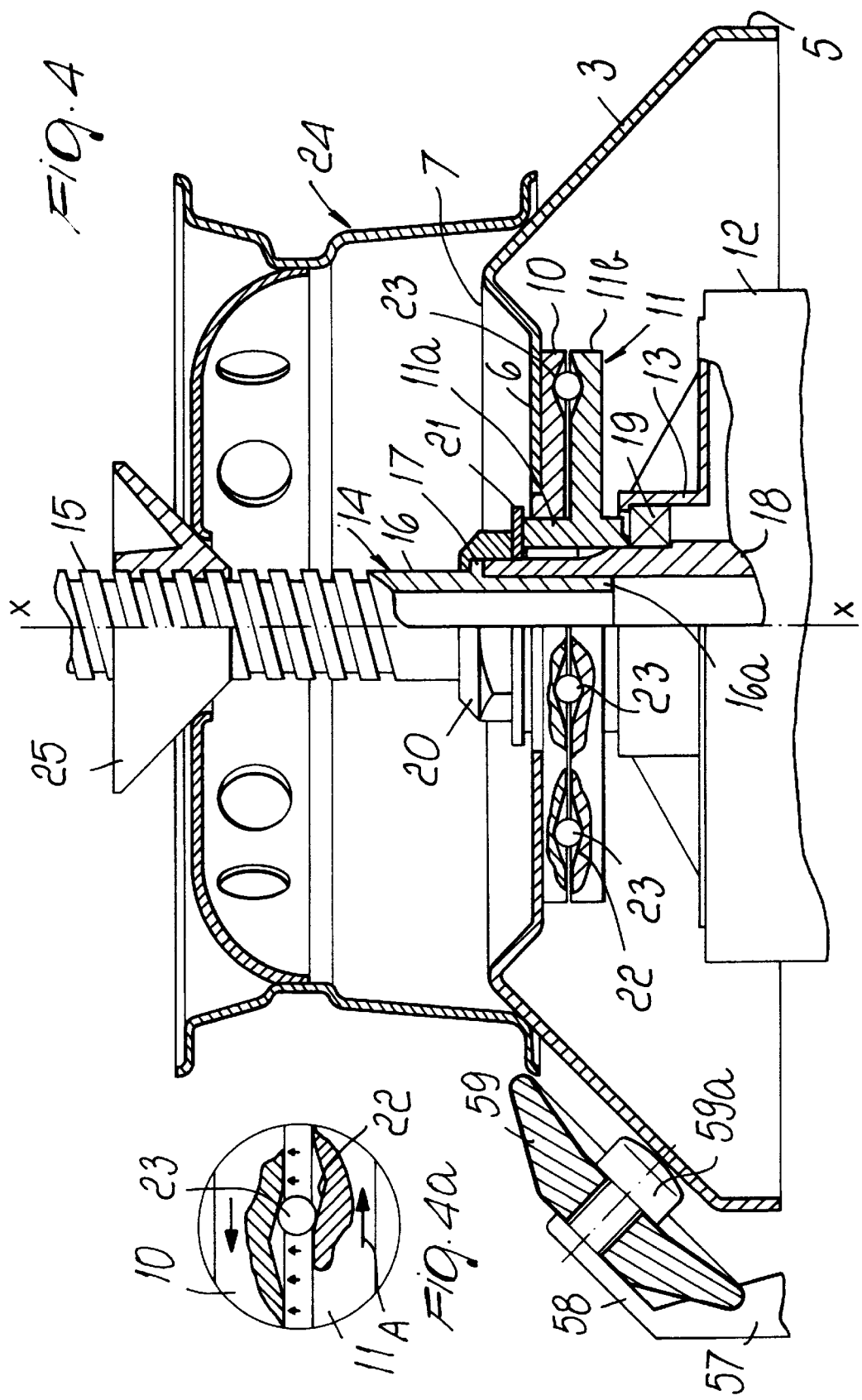

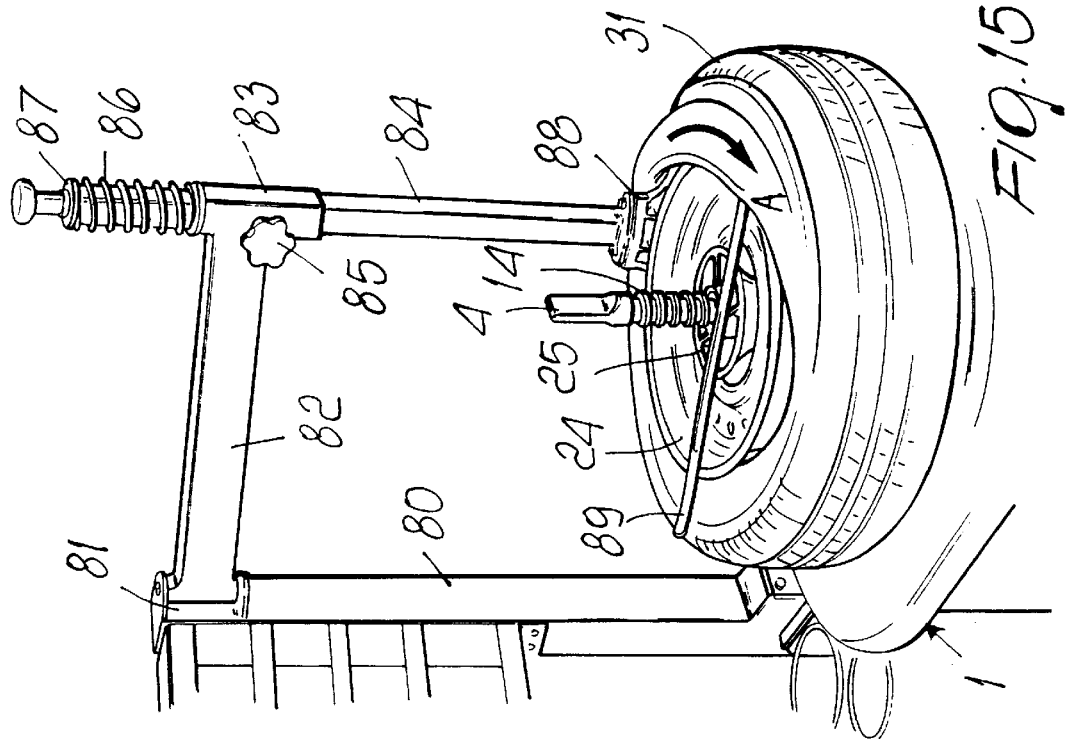
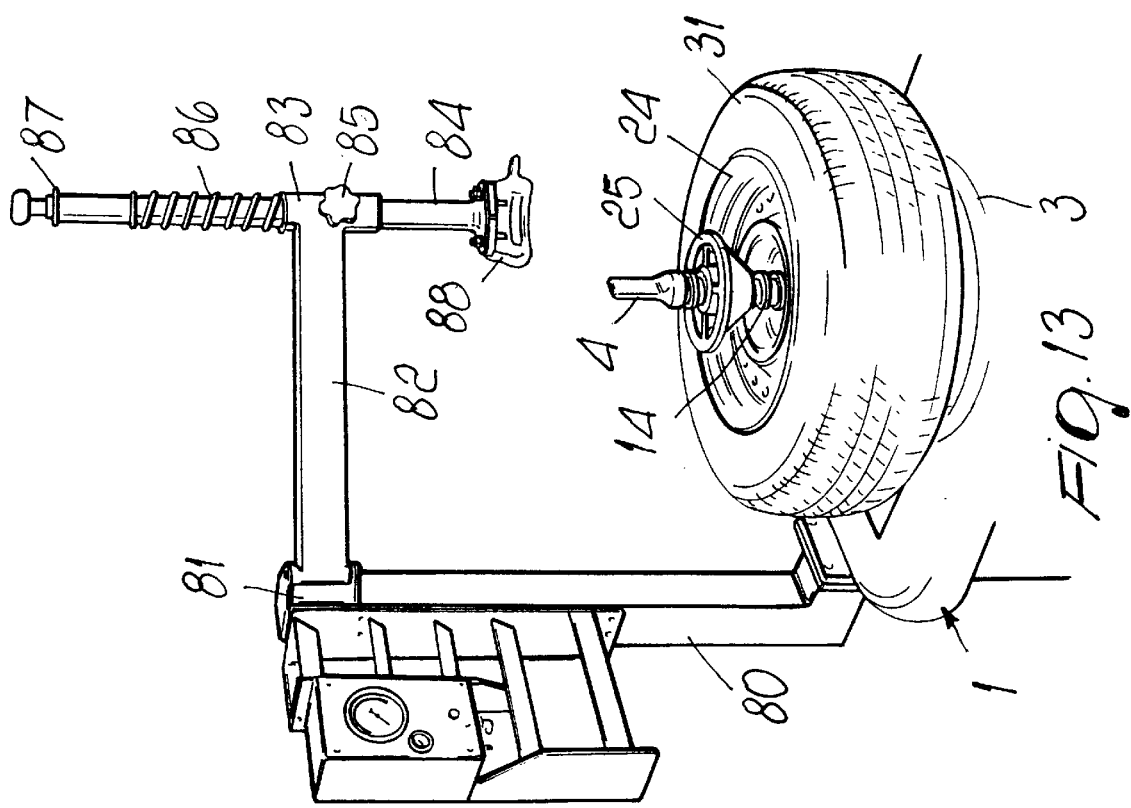

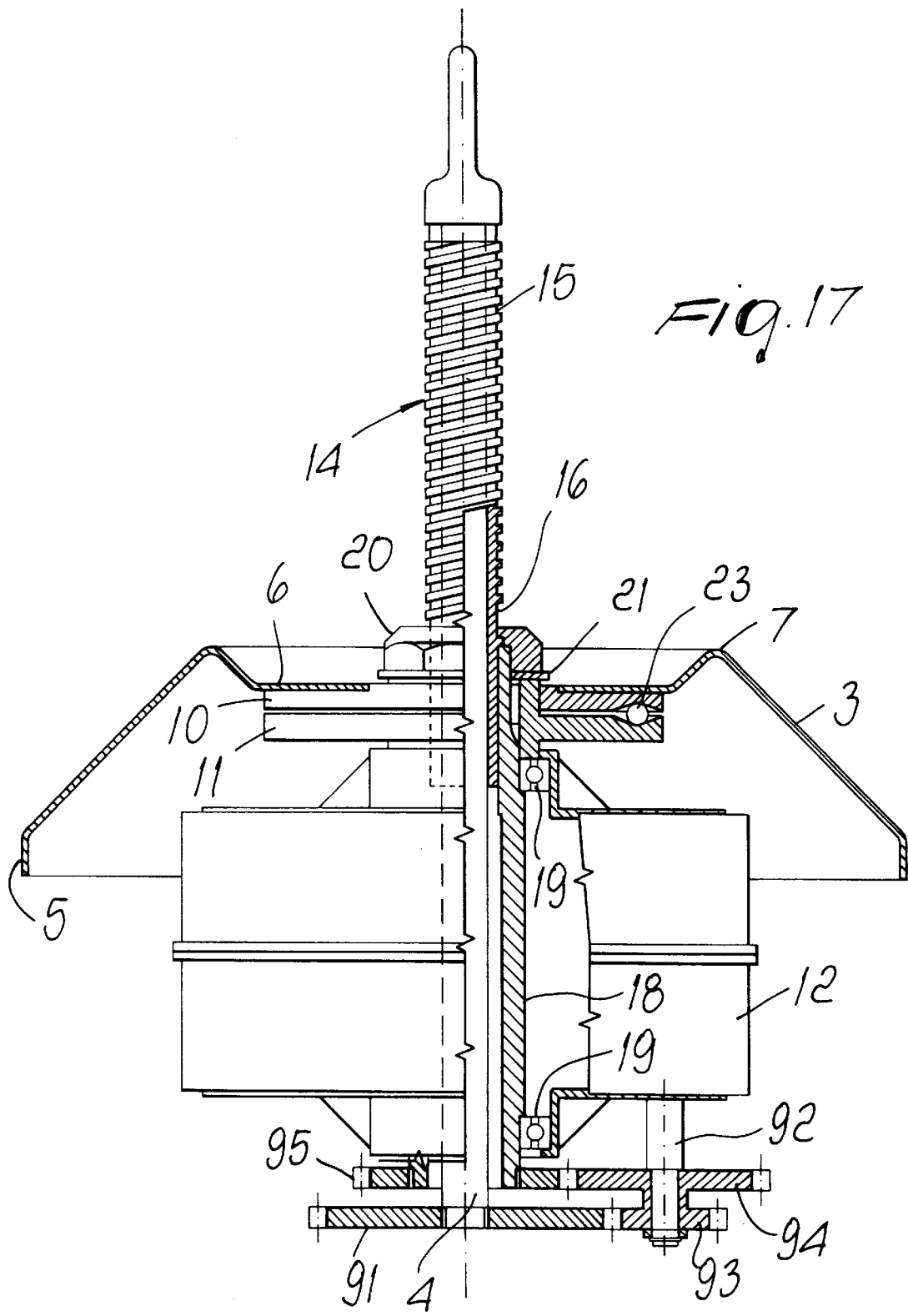

TIRE CHANGING MACHINE

BACKGROUND OF THE INVENTION

The present invention relates to a tire changing machine.

Tire changing machines of the type known as "American-style" machines have long been known—see patent U.S. Pat. No. 4,335,772 (Bubik et al.)—comprising a bed on which a fixed platform is provided bearing a pair of mutually opposite conical portions on which the wheel rim of tire wheels having diameters included in a wide range of values is located, and thus such tire changing machines can be used for wheels of various sizes. From the top platform of the bed there extend upwards a fixed, hollow and externally threaded shaft, a rotatable shaft coaxially arranged inside the fixed hollow shaft and terminating with a flat top portion projecting from the hollow shaft, and a locking pin which is designed to engage a wheel located on the fixed platform and is parallel to the fixed shaft.

A tire bead breaking operation is carried out by the squashing action of two mutually opposite shoes: one of which is supported by a lateral column carried by the bed and arranged to act by means of a lever system actuated by a suitable pneumatic cylinder from above downwards on the upward-facing bead of a tire, whereas the other is located within the bed and arranged to act upwards by means of a lever system which is actuated by a suitable pneumatic cylinder.

Once a local bead breaking is obtained, the operator then completes bead breaking along the whole periphery of the wheel by forcing the tire to rotate by hand. Should this require too much effort, the operator must release the heel, turn it through 180° about its own axis, lock it again and repeat the operation. He can then remove the tire by inserting a suitable manual tire tool in the flat portion of the rotating shaft.

Apart from the physical effort by the operator, such tire changing machines have bead breaking shoes, which must slidingly engage with the wheel rim and therefore cannot be used with light alloy wheel rims, since they would be damaged, and are provided with two pneumatic cylinders which are designed to actuate the upper and the lower bead breaking shoes, respectively. This entails the need of requiring considerable power for actuating the bead breaking shoes.

Another drawback of such conventional tire changing machines is the simultaneous movement of the bead breaking shoes and the rotating shaft, since the same power source, namely the pneumatic cylinders, is used to actuate both the shoes and the rotating shaft with no possibility to exclude neither the former nor the latter. Accordingly, during a tire mounting operation the lower shoe acts in a direction opposite to the tire mounting direction and thus hinders the tire mounting. Moreover, since the rotating shaft is driven by a pneumatic cylinder, it can perform an angular movement which is limited to less than 360° and a return stroke is required which entails a waste of time.

Moreover, to avoid sudden accelerations of the tire tool caused by this kind of driving system, when stress is no longer applied to the tire tool, hydraulic speed limiting circuits had to be provided for the pneumatic cylinders. This results in considerable shortcomings in the manufacture and difficulties in use.

In addition, tire changing machines of this kind can be used only with American-type wheels, that is to say, wheels which have a plurality of through holes in one of which the locking pin can be engaged, and not with other kind of wheels, most of which according to more recent trends do not possess such holes, e.g. spoke wheels.

SUMMARY OF THE INVENTION

An object of the present invention is to provide a tire changing machine of the above described type which is suitable for eliminating or drastically reducing the above described drawbacks.

Another object of the present invention is to provide a tire changing machine which allows to automate all the operations related to bead breaking and mounting and removal of tires and to apply grease to the beads during tire removal.

These and other objects which will become apparent hereinafter are achieved by a tire changing machine according to the invention, which comprises: a bed, a frustoconical platform which is supported by the bed and is designed to act as a support for a wheel rim, a hollow shaft which is coaxial to, and rotates rigidly with, the frustoconical platform and raises from said platform and is provided with a threaded portion, a fixed shaft which is arranged within said hollow shaft and protrudes therefrom, securing means scewable onto the hollow shaft for fixing the wheel rim on the platform, a lateral column raising from the said bed, upper bead breaking means carried by the said column and arranged to act from above on a tire on a wheel rim located on the frustoconical platform, lower bead breaking means arranged to act from below on the lower side of a tire on a whell rim placed on the platform, a driving motor for rotating the said frustoconical platform about the said hollow shaft, and automatic locking and releasing means between the said driving motor and said platform to safely clamp the platform against a wheel rim placed thereon.

BRIEF DESCRIPTION OF THE DRAWINGS

Further aspects and advantages of the present invention will become better apparent from the following detailed description of some currently preferred embodiments thereof, given by way of non-limiting examples with reference to the accompanying drawings, in which:

FIG. 4 is a cross-sectional view on an enlarged scale of a frustoconical platform and rolling-ball locking and releasing means between the motor and the platform;

FIG. 4A shows a detail in cross-section and on an enlarged scale view of the automatic rolling-ball locking and releasing means of FIG. 4;

FIG. 13 is an enlarged-scale perspective view of a variation of the machine of FIGS. 1 and 2, equipped with a turret and a cantilevered arm for locating a tire tool;

FIG. 15 is a view similar to that of FIG. 14, which illustrates a mounting operation by means of a mounting-removing tool and a conventional tire tool;

FIG. 17 is a view similar to that of FIG. 16, but with the secondary shaft rotatably mounted and operatively connected to the main shaft.

In the accompanying drawings, identical or similar parts or components have been indicated with the same reference numerals.

DESCRIPTION OF THE PREFERRED EMBODIMENTS

With reference to the above Figures, it will be seen that a tire changing machine according to the present invention has a supporting bed 1, which delimits at the top a worktable 2 above which a frustoconical platform 3 is supported for rotation about an axial vertical secondary shaft 4 which passes through the platform 3 and extends above it to a certain extent.

Figure 1:
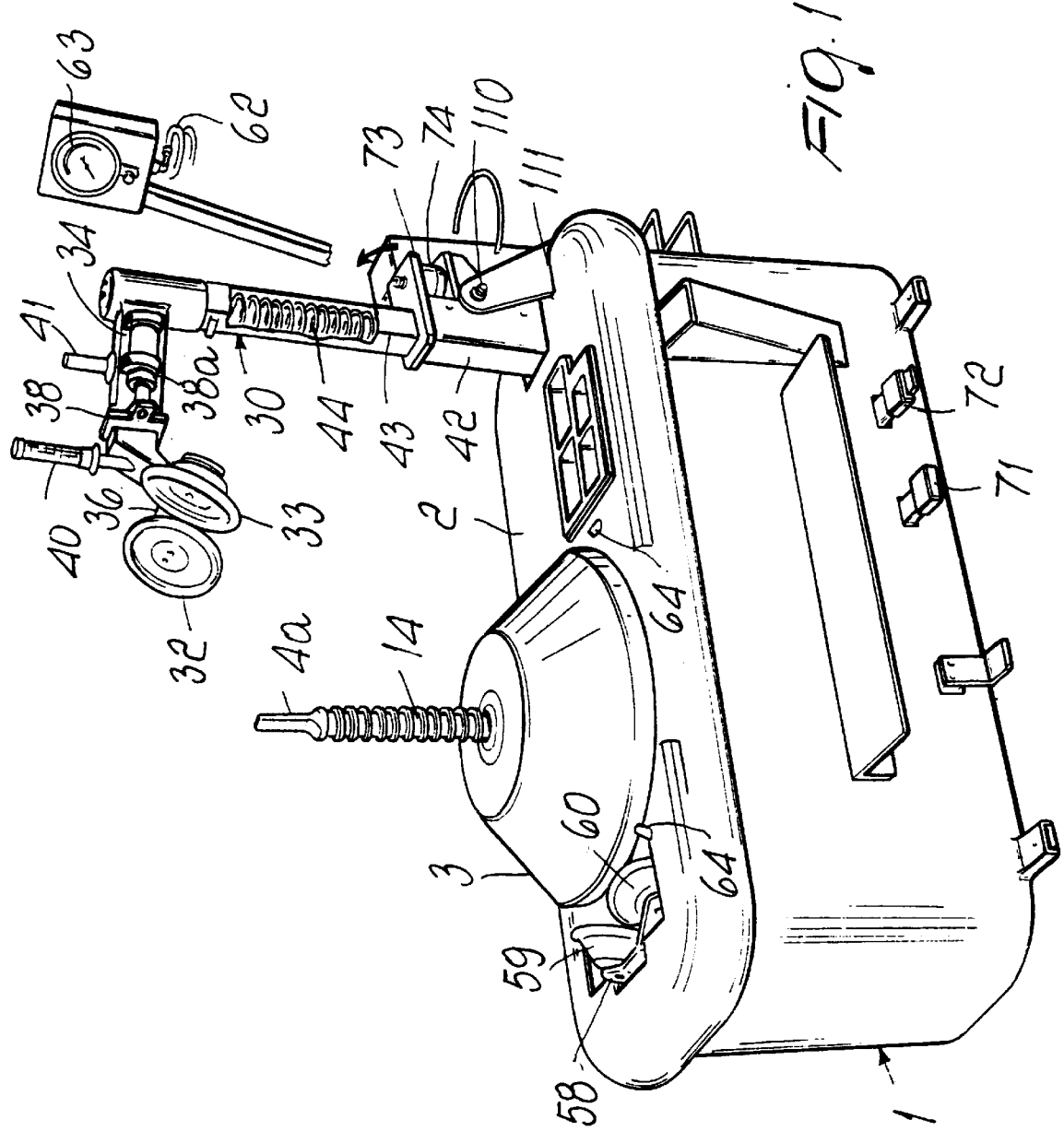
FIG. 1 is a front elevational perspective view, slightly from above of a tire changing machine according to the present invention in a rest condition ready to receive a wheel rim or a tire-fitted wheel rim.
Figure 2:
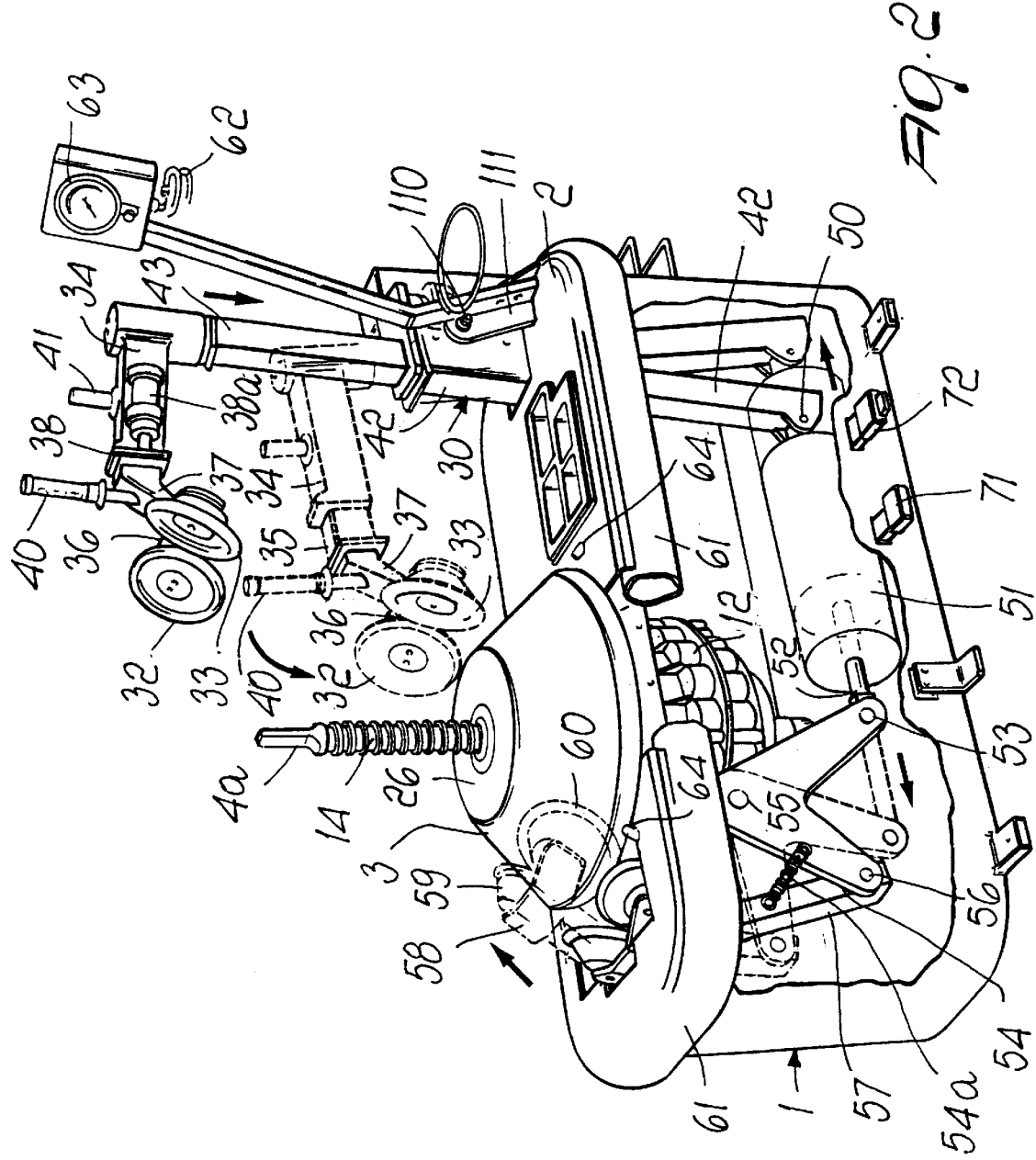
FIG. 2 is a view, similar to that of FIG. 1, but with some parts cut away and components in a different operating arrangement.
Figure 3:
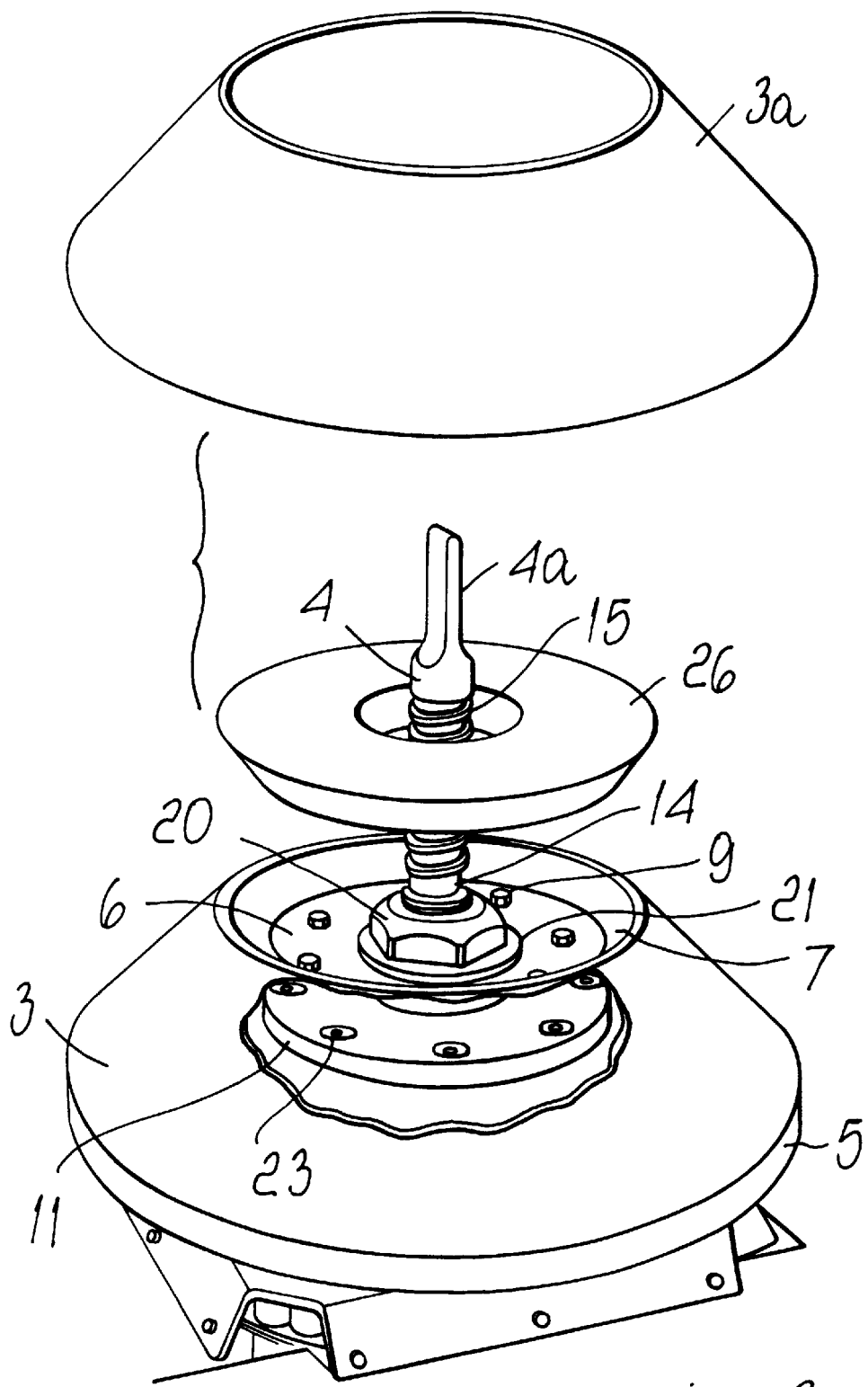
FIG. 3 shows a detail on an enlarged scale in exploded view of a frustoconical platform.

As shown more clearly in FIGS. 3 and 4, the frustoconical platform 3 is hollow and has a substantially cylindrical lower edge 5, whereas it is closed at the top by an annular wall 6 which is slightly recessed with respect to its peripheral rim 7 and is provided with an axial hole through which the secondary shaft 4 extends. The annular wall 6 is also formed with a plurality of holes which are angularly distributed around the axial hole and arranged to locate screws 9 for securing the wall 6 to an inner annular support element 10 designed to slidingly rest on a support ring 11 having a sleeve portion 11a and a flanged portion 11b. The support ring is, in turn, supported at the top end of a pneumatic motor, generally designated by the reference numeral 12, e.g. a pneumatic motor as described and illustrated in the European patent EP-0 358 729, which can be connected to a suitable source of compressed air (not shown in the drawings). The motor 12 has a tubular output shaft 18 rigid in rotation with the flanged ring 11.

The shaft 4 extends through the motor 12 and has a flattened portion at the top thereof which protrudes from a hollow main shaft 14 which has an outer coarse-pitch thread 15 and a non-threaded lower portion 16 with a flange 17. At its lower portion 16a below the flange 17, the main shaft 14 extends coaxially in the hollow output shaft 18 of the motor 12, so that it can rotate about the secondary shaft 4, and abuts against the shaft 18 with its flange 17.

One or more ball bearings 19 are provided between the shaft 18 and the casing 13 of the motor 12. The end of the shaft 18 that protrudes from the motor 12 is externally threaded and the sleeve 14 is secured to the shaft by means of a ring 20 which has hexagonal external shape and two internal diameters and can be screwed onto the shaft 18 to abut against the flange 17.

A robust washer 21 is also inserted on the shaft 18 and clamped between the flanged ring 11 and the ring 20. The outer diameter of the washer 21 (FIG. 4) is greater than the outer diameter of the sleeve portion 11a of the support ring, thereby protruding above the annular support 10 at a distance of a few millimeters therefrom.

With the above described arrangement, the lower face of the annular support 10 and the upper face of the flanged portion 11b of the support ring 11 are adjacent and facing one another. Moreover, each face is formed with a certain number of receiving seats, generally designated by the reference numeral 22, which are angularly distributed around the vertical axis x—x of the shaft 4 and each designed to accommodate a respective rolling ball 23. Each seat 22 extends tangentially to, and is delimited by four inclined-plane surfaces, i.e. two upper converging surfaces in the annular support 10 and two lower converging surfaces in the flange of the support ring 11 (FIG. 4A).

Preferably, the inclination of the inclined-plane surfaces is relatively small, e.g. ranging between 50 and 20° with respect to the axis x—x of the shaft 4, so as to ensure a good friction engagement between the balls 23 and the supporting elements 10 and 11.

Accordingly, whenever the driving shaft 18, and the flanged ring 11 with it, is rotated in either direction, e.g. in the direction of the arrow A in FIG. 4A, owing to the inertia of the overlying moving equipment comprising the support 10, the platform 3 and possibly a wheel rim arranged on the platform, it causes a relative movement between the flanged ring 11 and the annular support 10 which forces the balls 23 to roll along parallel (upper and lower) inclined planes, thereby causing a small lifting of the annular support 10 which can be equal to, or smaller than, the distance between the upper face of the support 10 and the lower face of the washer 21.

This small vertical movement of the support 10 is very important, since it causes the frustoconical platform 3 to be forced against the lower edge of the wheel 24, which is locked at the top by an internally threaded and externally conical bush 25, which is better known as "cone" in the art and can be of any suitable kind. The cone 25 is screwed onto the threaded portion 15 of the sleeve 14, thereby ensuring safe automatic locking between the platform 3 and the wheel rim 24 so as to make them rigid in rotation, and this even in the case the bush 25 had not been fully screwed or should the wheel rim 24 not develop sufficient friction against the platform 3.

Figure 4B:
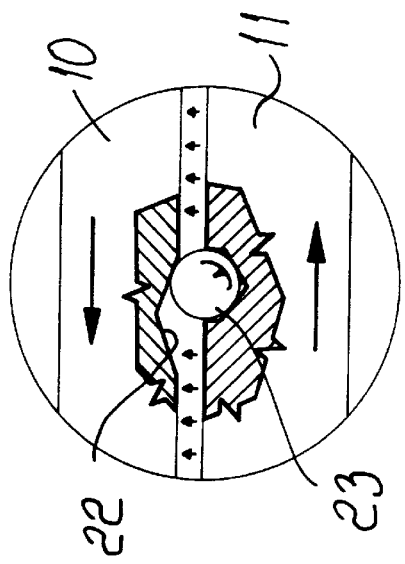
FIGS. 4B and 4C illustrate details in cross-section of a variation of fixed-ball automatic locking-releasing means in two different operating positions.
Figure 4C:
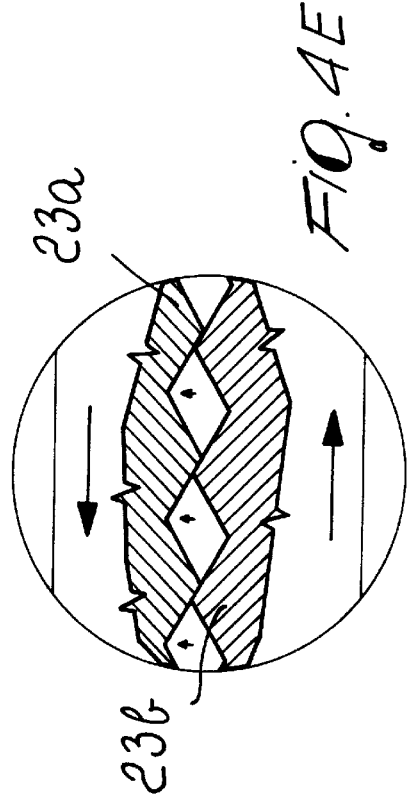
Figure 4D:
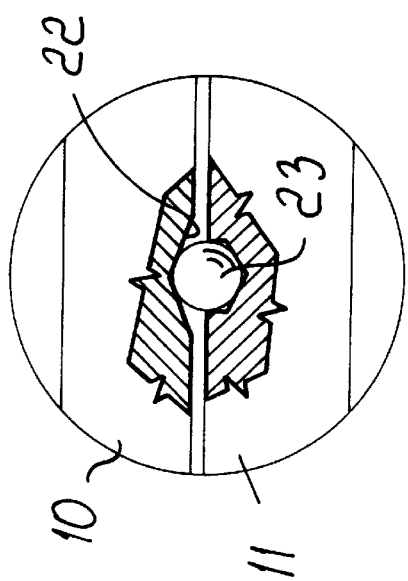
FIGS. 4D and 4E show details in cross-section of another variation of automatic locking and releasing means with mutually opposite inclined planes.
Figure 4E:
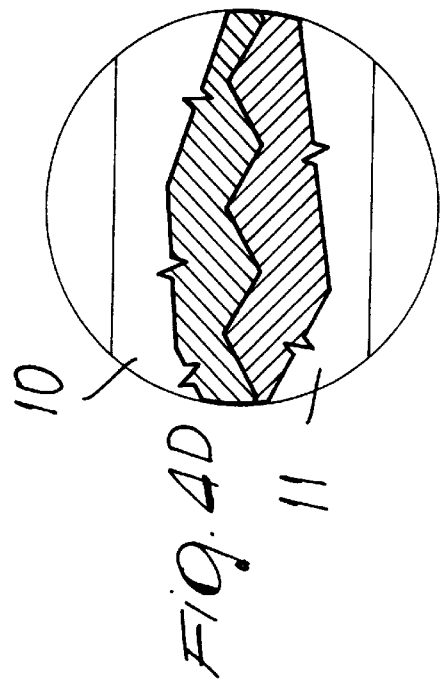

FIGS. 4B and 4C illustrate a variation, according to which the balls 23 are firmly seated in the flanged ring 11 and the inclined-plane surfaces of the seat 22 formed in the support 10 can slide with friction on said balls, whereas FIGS. 4D and 4E illustrate a variation which also provides for friction sliding between mutually opposite inclined-plane surfaces delimited on a plurality of teeth 23a, formed in the support 10, and 23b formed in the flanged ring 11 and arranged to mutually engage with teeth 23a.

Advantageously, on the lowered annular wall 6 a frustoconical ring 26 can be provided (FIG. 3) which is made of elastic material, e.g. rubber, and on which the central part of the wheel rim can rest without being scratched or otherwise superficially damaged. Moreover, the outer frustoconical surface of the platform 3 can be covered and protected by a frustoconical cover 3a, which is designed to avoid any damage to the edges of light-alloy wheel rims.

Figure 5:
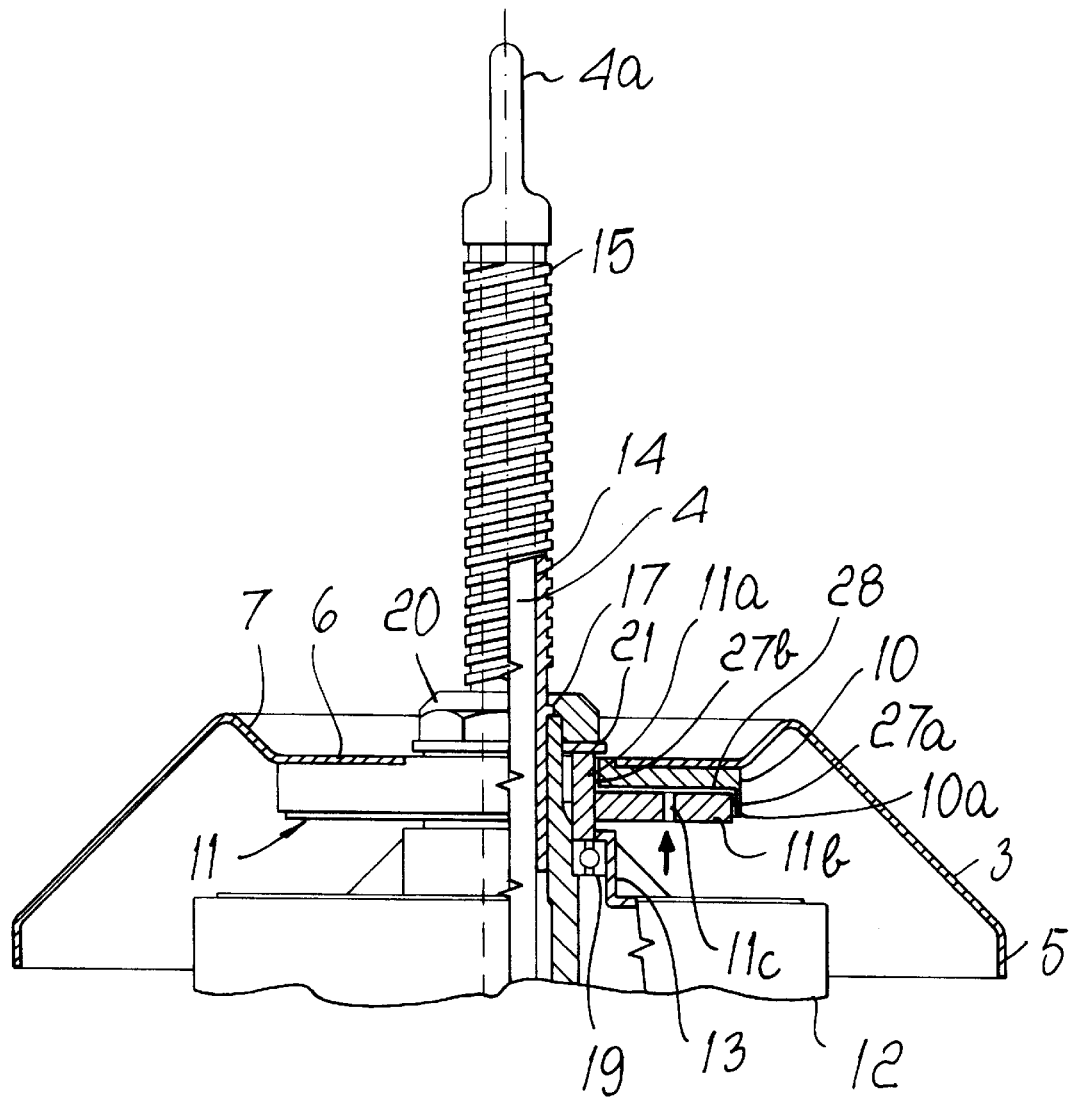
FIG. 5 is a view similar to that of FIG. 4, but illustrating an embodiment of automatic locking and releasing means of pneumatic type between motor and platform.

In the embodiment shown in FIG. 5 the annular support 10 has an outer edge 10a which extends downwards so as to engage likewise a bell at least part of the thickness of the flanged portion 11b of the support ring 11.

Between the annular support 10 and the supporting 11 two sealing gaskets are provided: one 27a between the inner face of the peripheral edge 10a of the annular support 10 and the peripheral front of the flanged portion 11b and the other 27b between the outer surface of the sleeve 11a and the inner diameter of the annular support 10.

A transverse hole 11c formed in the flanged portion 11b can be connected via connection means of any suitable type to a source of a pressurized fluid (air) in order to feed, e.g. upon control of electric valves, pressurized fluid into the variable-volume annular gap or chamber 28 between the flanged portion 11b and the annular support 10, thereby causing the chamber 28 to expand and the annular support 10 to raise 3 to 4 mm until it abuts against the washer 21 and thus until the platform 3 abuts against the wheel rim 24 in order to make it rigid in rotation therewith, until the pressurized fluid is discharged from the gap 28.

Figure 6:
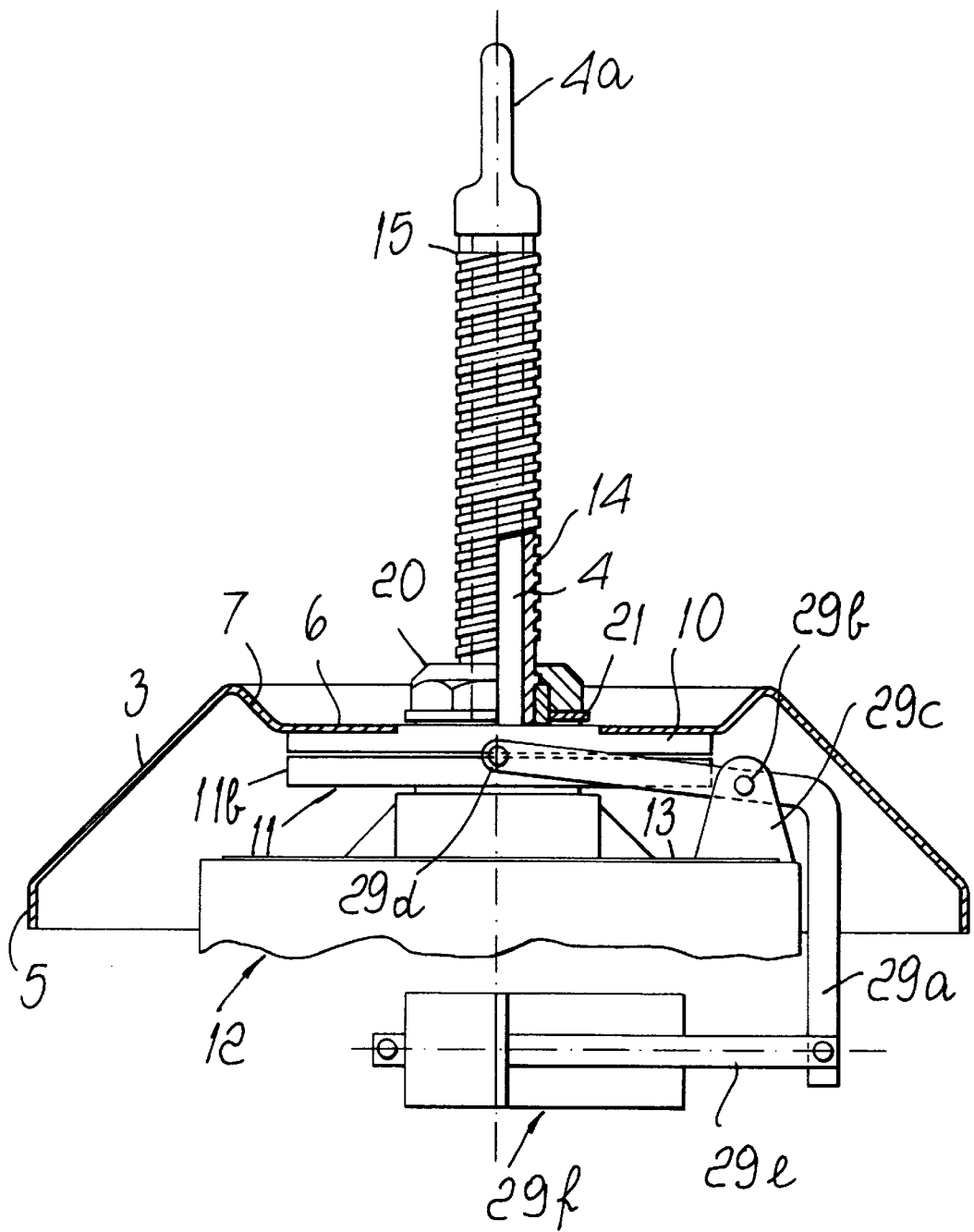
FIG. 6 is a view similar to that of FIG. 4, but concerning an embodiment with lever driving for the locking and releasing means between motor and platform.
Figure 7:
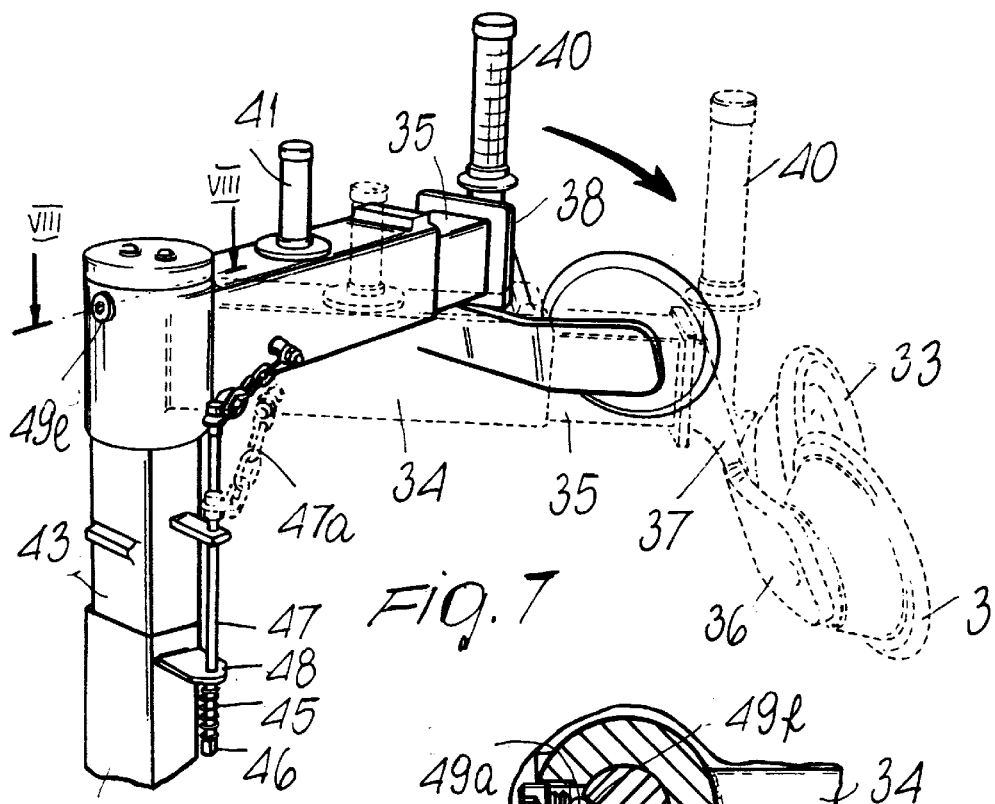
FIG. 7 is a partial perspective view on an enlarged scale of the column and the upper roller bearing arm.
Figure 8:
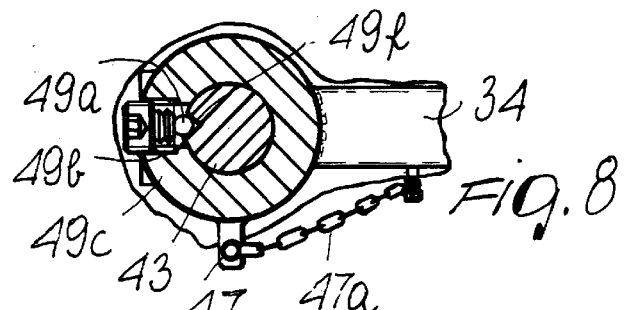
FIG. 8 shows a detail in cross-section taken along the line VIII—VIII of FIG. 7.

FIG. 6 is a view of a variation in which the relative lifting and lowering movement is controlled by locking and releasing means constituted by a lever system which comprises an L-shaped lever 29a, which is pivoted at 29b to a support 29c which is rigidly secured to the casing 13 of the motor 12 and has an end thereof which is articulated to a horizontal pin 29d which is fixed to the annular support 10 and the other end thereof which is pivoted at the tip of a piston rod 29e of a fluid-operated double-acting cylinder-and-piston control unit 29f. When the fluid-operated unit 29f is contracting itself, the annular support 10 is lifted until it abuts against the washer 21 in order to make the platform 3 rigid in rotation with a wheel rim 24, whereas when it is extending, the platform 3 is lowered and partly disengages itself from the wheel rim.

Of course, in the above described examples of embodiments of FIGS. 5 and 6, differently from what occurs in the embodiments shown in FIGS. 4 to 4E, the small relative lifting-lowering movement, e.g. of the order of 3 to 5 mm, of the platform 3 with respect to a wheel rim 24 arranged thereon can also be performed while the wheel rim 24 is stationary, i.e. not rotated by the motor 12. This makes it possible also to apply the locking-release means shown in FIGS. 5 and 6 to tire changing machines of the so-called American type referred to above, which comprise opposite and non rotating conical portions for supporting the wheel rims.

The above described locking and releasing means can be adapted in any suitable manner easily apparent to a person skilled in the art to act on the wheel rim 24 rather than on the platform 3 to control the relative lowering-lifting movement of the wheel rim with respect to the platform 3.

In any case, the provision of a small relative lowering and lifting movement of the platform 3 with respect to the wheel rim 24 or lowering and lifting movement of the wheel rim 24 with respect to the platform 3 makes it possible to eliminate accidents should the operator control the locking and releasing means between the platform 3 and the wheel rim 24 while inadvertently keeping his hand between the cone 25 and the wheel rim, bearing in mind that the extent of the relative movement is very small.

Moreover, the tire changing machine has a lateral column or post 30 for supporting upper shoe means arranged to act from above on a tire 31 (FIGS. 6 to 11) placed on the wheel rim 24 which, in turn, rests on the frustoconical platform 3 (FIGS. 1, 2, 5 to 7 and 10). Such shoe means are constituted by two identical frustoconical rollers 32 and 33, e.g. made of resistant and tough plastics material and idly supported so that they can freely rotate about substantially horizontal axes which converge towards the rotation axis of the platform 3, at the distal end of a cantilevered arm which is formed by two telescopic elements 34 and 35 and supported at the top by the lateral column 30.

More particularly, the rollers 32 and 33 are mounted free to rotate on a slightly curved cross-member 36 supported by a stem 37 which is inclined upwards, attached to the end of the element 35 and projects outwards therefrom. The telescopic arm constituted by the elements 34 and 35 is supported so as to project from the top of the lateral column 30. The cantilever arm formed by the elements 34 and 35 is normally locked in position. However, a locking ring 38 having a wedge-shaped portion is advantageously inserted onto the telescopic element 35 and can be inserted on the end of the element 34 for safe locking in a desired telescopic position of the arm 35.

If desired, the locking and unlocking movements of the locking ring 38 into the tubular element 34 can be automatically controlled by a linear actuator, e.g. a double-acting pneumatic jack 38a carried by the element 34 (FIGS. 1,2, 6, 7, 11 and 14) and controllable by pressing a pedal 72, as will be explained hereinafter.

A vertical handle 40 is preferably provided on the stem 36 for manual positioning of the rollers 32 and 33, whereas a pin 41 extends upwards from the element 34 to receive the bush 25 when it is removed from the threaded sleeve 14.

The column 30 is constituted by two telescopic sleeves: a lower one 42 and an upper one 43 which is partly inserted into the lower sleeve 42. The telescopic movement for the insertion of the upper sleeve 43 into the lower sleeve 42 to adjust the operation height of the rollers 32 and 33 on wheel rims and tires of various widths or heights is opposed by an inner loading spring 44.

Moreover, the upper arm 34 can perform angular movements with respect to the upper sleeve 43 to allow the bead breaking rollers 32 and 33 to horizontally swing above the worktable 2 in order to facilitate mounting and removal operations. The angular movement for positioning the rollers 32 and 33 at the beginning of a working step is entirely manual by acting on the handle 40.

Figure 11:
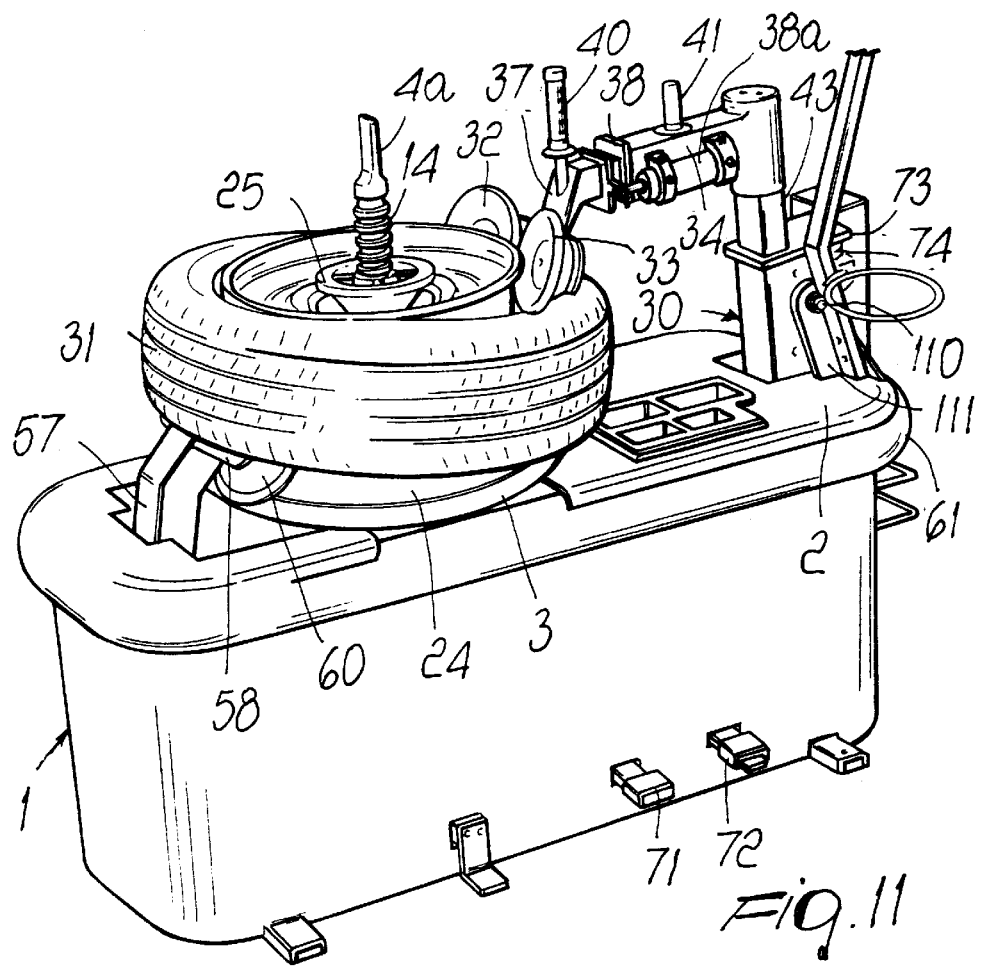
FIG. 11 shows a diagrammatic perspective view of a bead breaking operation simultaneously carried out by means of the upper and the lower shoe by taking advantage of the rotation of the support platform for the wheel rim.

Simultaneously with the swinging movement, the operator manually pushes the upper arm 34 downwards, in contrast with the loading spring 44 which acts between the sleeves 42 and 43, until the bead breaking rollers 32 and 33 are in contact with the bead of the tire (FIG. 11).

Once a bead breaking operation has been completed, during the releasing step the compressed spring 44 elongates, providing the thrust required for the upward return stroke of the entire unit. This lifting movement is contrasted, in its final part, by a spring 45 (FIG. 7) acting between a nut 46 which is screwed onto the lower end of a rod 47 mounted along the upper sleeve 43 and a fixed bracket 48 for fitting the rod 47 secured to the lower sleeve 42. The spring 45, while being compressed, pulls through the rod 47 a chain 47*a* which by being, in turn, anchored to the arm 34, causes the latter to effect an angular movement, thereby causing the upper arm 34 to partly rotate so as to move away from the the work area and to reach its resting position.

The arm 34 is releasably kept in its resting position by holding means, e.g. a ball 49*a* which can be partly seated in a radial hole 49*b* in a sleeve 49*c* mounted for rotation at the top of the upper sleeve 43 and rigid with the element 34, by a loading spring 49*d*, by a closing plug 49*e* for the radial hole 49*b* and by a recess 49*f* arranged to engage with the ball 49*b* and formed in the upper sleeve 43.

The lower sleeve 42 is articulated, at an intermediate portion thereof, to the bed 1 about a horizontal articulation axis 110, e.g. supported by a pair of arms 111 integral with the bed and arranged at a lower level than that of the platform 3 and thus of the wheel rim 24 placed thereon, thereby allowing a radial "pitching" motion of the bead breaking rollers 32 and 33 with respect to the platform 2 and thus with respect to the wheel rim 24 for an inclined accurate penetration of the bead breaking rollers 32 and 33 between the peripheral edge of the wheel rim and the bead of the tire resting thereon. At its lower end, the lower sleeve 2 is pivoted at 50 (FIG. 2) to an articulation axis parallel to the pitching axis 110, e.g. to the cylinder of a linear double-acting cylinder-and-piston actuator 51, the piston rod 52 of which is articulated at 53 to an arm of an L-shaped lever 54.

If desired, instead of a double-acting cylinder it is possible to use a cylinder with two piston rods 52, one of which is articulated at 50 to the lower sleeve 42 while the other is articulated to the L-shaped lever 54.

The L-shaped lever 54 is pivoted at 55 to the bed 1 and has its other arm resiliently loaded by a spring 54*a* and articulated at 56 to the lower end of a post 57. The post 57 can be raised and lowered and supports, at its upper end, a slightly curved cross-member 58 which is similar to the cross-inember 36 and supports, in turn, two freely rotating bead breaking rollers 59 and 60 which are similar to the rollers 32 and 33 but orientated in the opposite direction and having rotation axes, which converge toward the rotation axis of the frustoconical platform 3, and orientation substantially inclined in accordance with the taper of the platform 3.

The provision of a single pneumatic cylinder 51, besides making it possible to use half the power needed with conventional machines, also allows to position, by acting on the pedal 72, the piston rod(s) 52 even at intermediate positions, e.g. to keep the two beads of the tire 31 pressed from opposite sides during rotation of the platform 3 or even in order to fully lubricate the bead during a removal operation or even to use the upper rollers 32 and 33 as bead pressers during a mounting operation.

More particularly, for mounting or bead breaking of a tire 31 it is necessary to keep the upper rollers 32 and 33 and the lower ones 59 and 60 in operative position.

To this end, the pedal 72 comprises a double pedal (FIGS. 9A, 9B, 9C), i.e. a longer lower lever arm 72*a* pivoted at 72*b* inside the bed 1 and laterally extending outwards therefrom, a shorter upper L-shaped lever arm 72*c* pivoted at 72*d* to the lower arm 72*a*, a return spring 72*e*, e.g. of extension type, acting between the other arm 72*f* of the upper lever arm and a pin 72*g* secured to the bed. The lower lever arm 72*a* at its fulcrum 72*b* is integral with a cross rod 72*h*, e.g. extending at right angles with respect to the arm 72*a*, which has at its ends a pin, 72*i* and 72*l* respectively, arranged to open upon control a respective control valve 72*m* and 72*n* for the two-piston rod cylinder 51, thereby controlling the positioning of the upper rollers 32 and 33 and the lower rollers 59 and 60.

The lower lever arm 72*a* can take three positions: a raised, an intermediate (horizontal) and a lowered position, whereas the upper lever arm 72*c* can take two positions: a raised one and a lowered one.

Figure 9A:
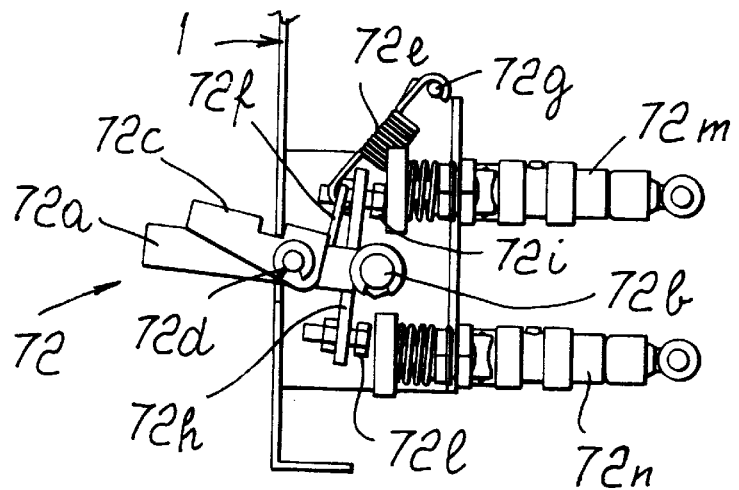
FIGS. 9A, 9B and 9C are each a side view on an enlarged scale of a control pedal illustrated in three different operating positions.

FIG. 9A shows both upper and lower lever arms in raised position corresponding to an operating condition in which the upper and lower rollers are in a resting position, i.e. away from the platform 3 (FIG. 1), in other terms the valve 72*m* is closed and the valve 72*n* is open.

Figure 9B:
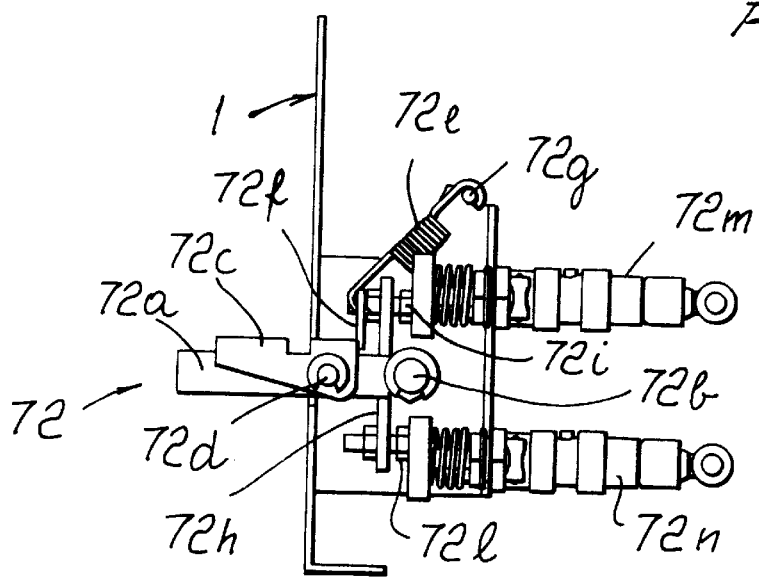
Figure 9C:
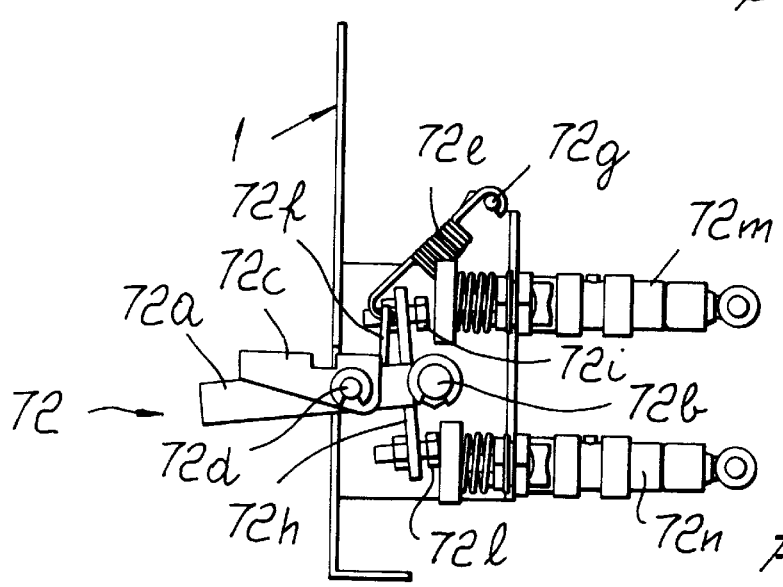

Should the operator press both pedals 72*a* and 72*c* the configuration shown in FIG. 9C is reached in which the upper lever arm is arranged horizontal and the lower lever arm is lowered so as to open the valve 72*m* and close the valve 72*n*, thereby causing the rollers 32 and 33 to get near to the platform 3 and the rollers 59 and 60 to raise. When the lower pedal 72*a* is lifted to its intermediate position (FIG. 9B) both valves 72*m* and 72*n* are closed and the rollers 32, 33 and 59, 60 are kept in their reached position.

The lower bead breaker constituted by the rollers 59 and 60 can also be used as a lifting device for particularly heavy tires during removal.

Preferably, the cross-member 58 is articulated to the post 57 and pushing springs of any suitable type (not shown in the drawings) having thrust center away from the rotation axis of the platform 3 are provided in order to produce a moment designed to guide the rollers 59 and 60 so that they automatically follow first the taper of the platform 3 and to assist them in automatically move over the lower edge of the wheel rim 24 on the platform.

As more clearly shown in FIG. 4, the frustoconical rollers 59 and 60, likewise the rollers 32 and 33, being made of synthetic material, do not damage in any way the wheel rims 24 even if the latter are made of a light alloy. The same rollers assist in the mounting and bead breaking operations, as will be further specified hereinbelow, since they are freely rotatable components that generate far less friction between the bead of the tire and the wheel rim, even during operations which require the platform 3 to rotate, than conventional bead breaking shoes.

The rollers 59 and 60 also have a respective hub, that is also made of synthetic material (only the hub of the roller 59 being visible in the drawings—FIG. 4—and indicated by the reference numeral 59*a*) and has a rounded free end and a length such as to ensure that the free edge of its respective roller surmounts, in use, without striking it, the edge of the wheel rim 24 resting on the platform 3, during the lifting movements of the post 57.

Directly below the worktable 2, the bed 1 comprises an annular tubular element 61 that in addition to acting as a supporting and surrounding frame for the worktable 2, also delimits a compressed air reservoir provided with an automatic loading valve which can be connected to a suitable source of compressed air, such as a compressor, not shown in the drawings, and with feeding valves (the valves being not shown in the drawings and being of any suitable type). There are two feeding valves: one is arranged to feed a flexible tube 62 having a control pressure gauge 63 for inflation by means of the pumping up valve of the tire 31, and the other one is arranged for the so-called "fast" pumping up by means of jet-forming nozzles 64 which project from the worktable 2 and are angularly spaced around the platform 3.

Figure 10:
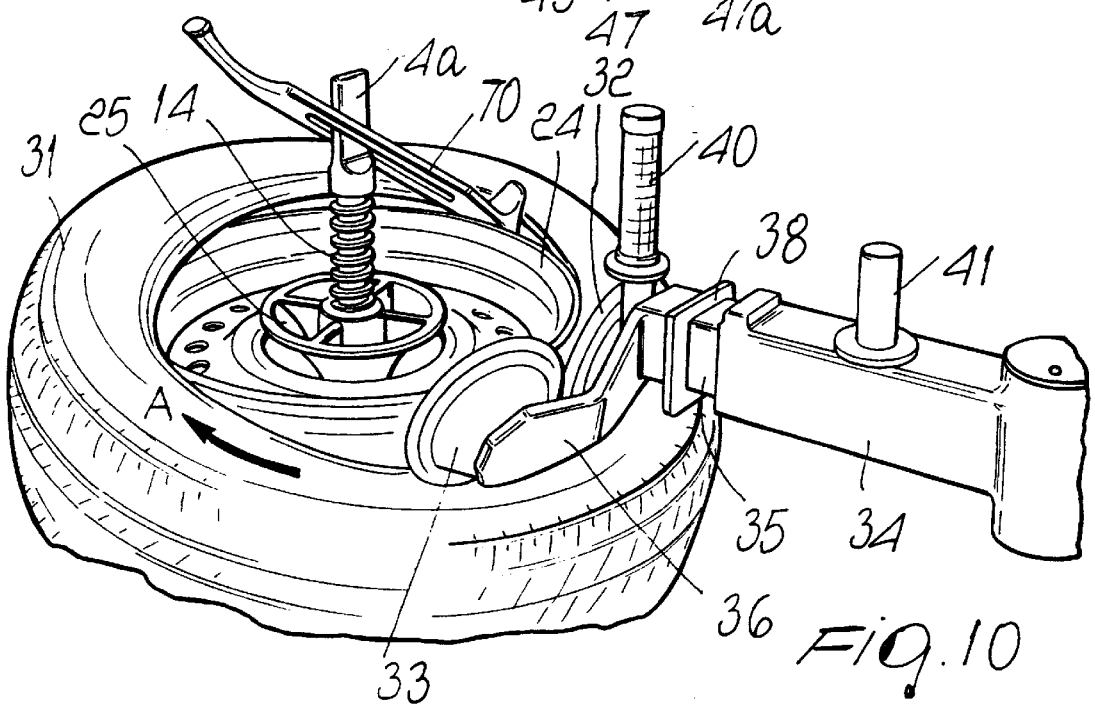
FIG. 10 is a partial perspective view slightly from above which illustrates a tire mounting operation by means of a upper bead lifting means and a mounting lever tool which is maintained in a substantially radial position by the shaft coaxial to the platform.

The tire changing machine according to the present invention can perform tire mounting, tire bead breaking and tire removal in a quick and safe manner and without effort on the part of the operator. Thus, as shown in FIG. 10, by manually lowering the rollers 32 and 33 by acting on the handle 40 so that they are brought to act on the bead of a tire 31 on the wheel rim 24 located on the platform 3, and by using a conventional tire tool 70 inserted on the flattened top of the secondary shaft 4 and by causing the platform 3 to rotate in the direction indicated by the arrow A, it is possible to perform a tire mounting operation. The operator merely needs to place the rollers 32 and 33 in their working position and possibly to lock them in said position by positioning the ring 38 by pressing the pedal 72 in the configuration illustrated in FIG. 9B, to insert the slotted tire tool 70 in position and to press a pedal 71 for starting the motor 12. The latter initially slightly lifts the platform 3 against the wheel rim 24 in order to firmly engage it therewith by means of the balls 23 and then the mounting operation will be performed.

In order to perform bead breaking operations (FIG. 11), the operator moves, as described above, the rollers 32 and 33 into the working position and locks them in position by means of the ring 38; then presses a bead breaking pedal 72 so as to move it in its configuration shown in FIG. 9B, whereby the two sleeves 42 and 43 are simultaneously blocked by means of a locking element 73 which is actuated by a small single-acting pneumatic cylinder 74 (FIGS. 1 and 11) and the piston rods 52 of the linear actuator 51 are caused to extend outwards, so that, on the one hand, the rollers 32 and 33 are pressed onto the upper bead of the tire 31 and, on the other, the post 57 is lifted and thus the rollers 59 and 60 are pushed out of the platform 3 to act on the lower bead of the tire 31. Finally, by pressing the pedal 71, the platform 3 is first slightly lifted and then rotated to complete the bead breaking operation.

Figure 12:
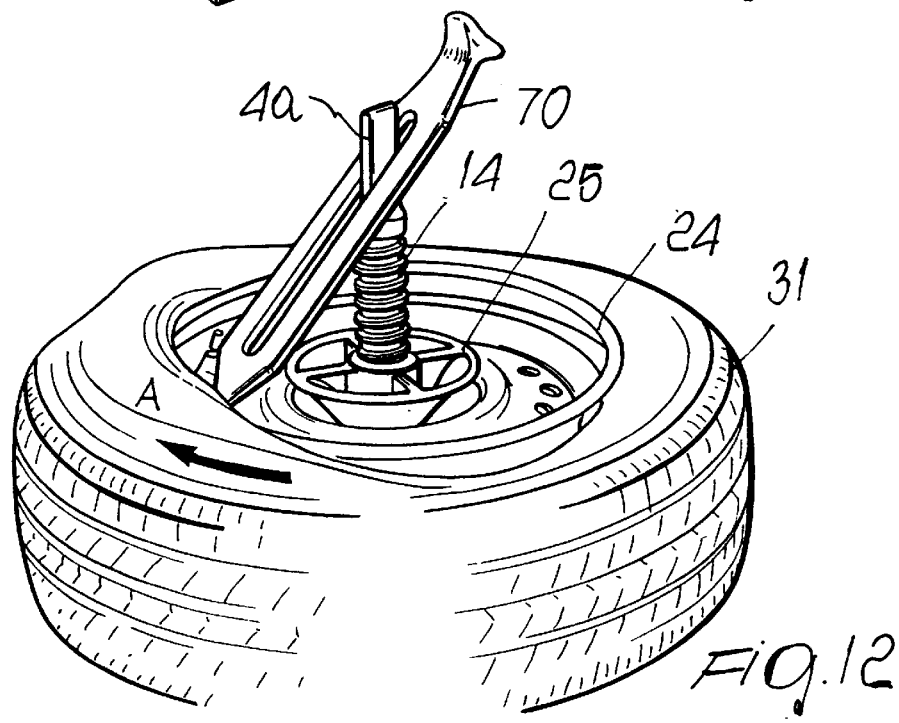
FIG. 12 shows a diagrammatic perspective view of a tire removing operation by means of a tire tool kept in a fixed position by the coaxial shaft, while the platform rotates with the wheel rim locked thereon.

A removal operation is shown in FIG. 12 and is performed by means of a slotted tire tool 70 which is inserted onto the flattened top end of the fixed shaft 4. Owing to the fact that shaft 4 is fixed, there is no risk of tire tool 70 being accidentally thrown at the end of the operation, as is the case sometimes with conventional tire mounting machines having a rotating central shaft and fixed platform.

Figure 14:
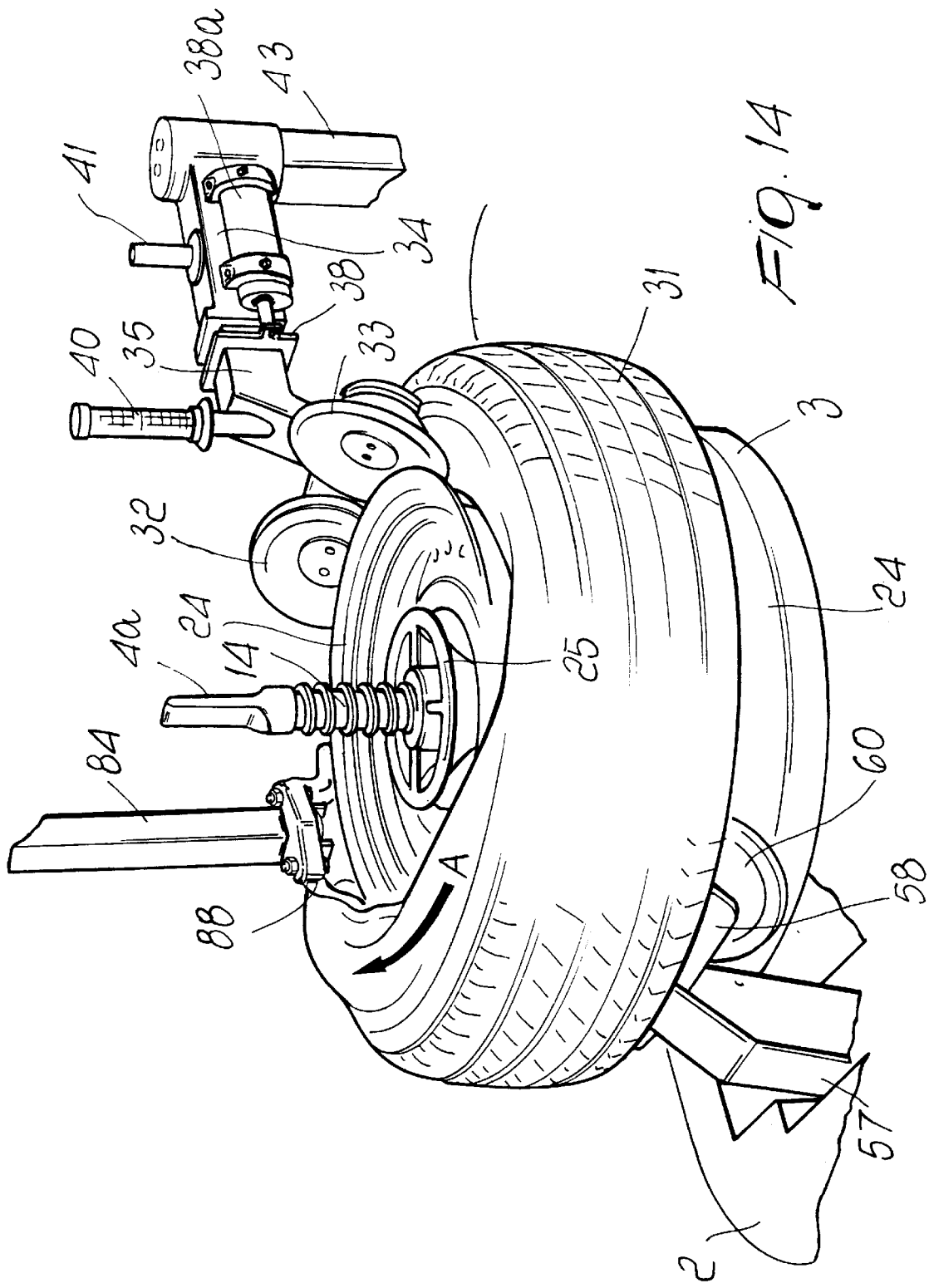
FIG. 14 is a partial perspective view of the tire changing machine according to the variation of FIG. 13, which illustrates a tire mounting operation on a wheel rim by means of upper and lower bead breaking means and of a tire tool which is supported in a cantilevered fashion.

FIGS. 13 to 15 illustrate a different embodiment of the tire changing machine of the present invention, according to which an auxiliary lateral turret 80 is provided which is fixed at its lower portion in any suitable manner to the bed 1, whereas at the top thereof a sleeve 81 is provided that can rotate about a vertical axis. The sleeve 81 is secured to one end of a cantilever arm 82, the other end of which supports a vertical tubular guide 83 inside which a tool supporting rod 83 can slide. The guide 83 has a knob 85 for locking the rod 84. A helical compression spring 86 is inserted on the upper portion of the rod 84 that protrudes from the guide 83 and acts between a flange 87 of the rod 84 and the guide. The rod 84 supports, at its lower end, a mounting and removal tool 88, e.g. a tool made of tough synthetic material with a low friction coefficient, of a kind which is known in the art—reference should be made to Italian patent IT -218 234 (Butler) filed on Feb. 28, 1989.

By using a removal and mounting tool 88 it is possible to perform mounting operations in a simple and quick manner, as shown in FIG. 14, with the cooperation of both the upper rollers 32 and 33 and of the lower rollers 59 and 60.

By using a conventional and well known tire tool 89, it is instead possible to perform quick removals, as shown in FIG. 15, again without the need for the operator to move around the tire changing machine or to apply wearying efforts.

The above described tire changing machine is susceptible of numerous modifications and variations within the scope defined by the appended claims.

Figure 16:
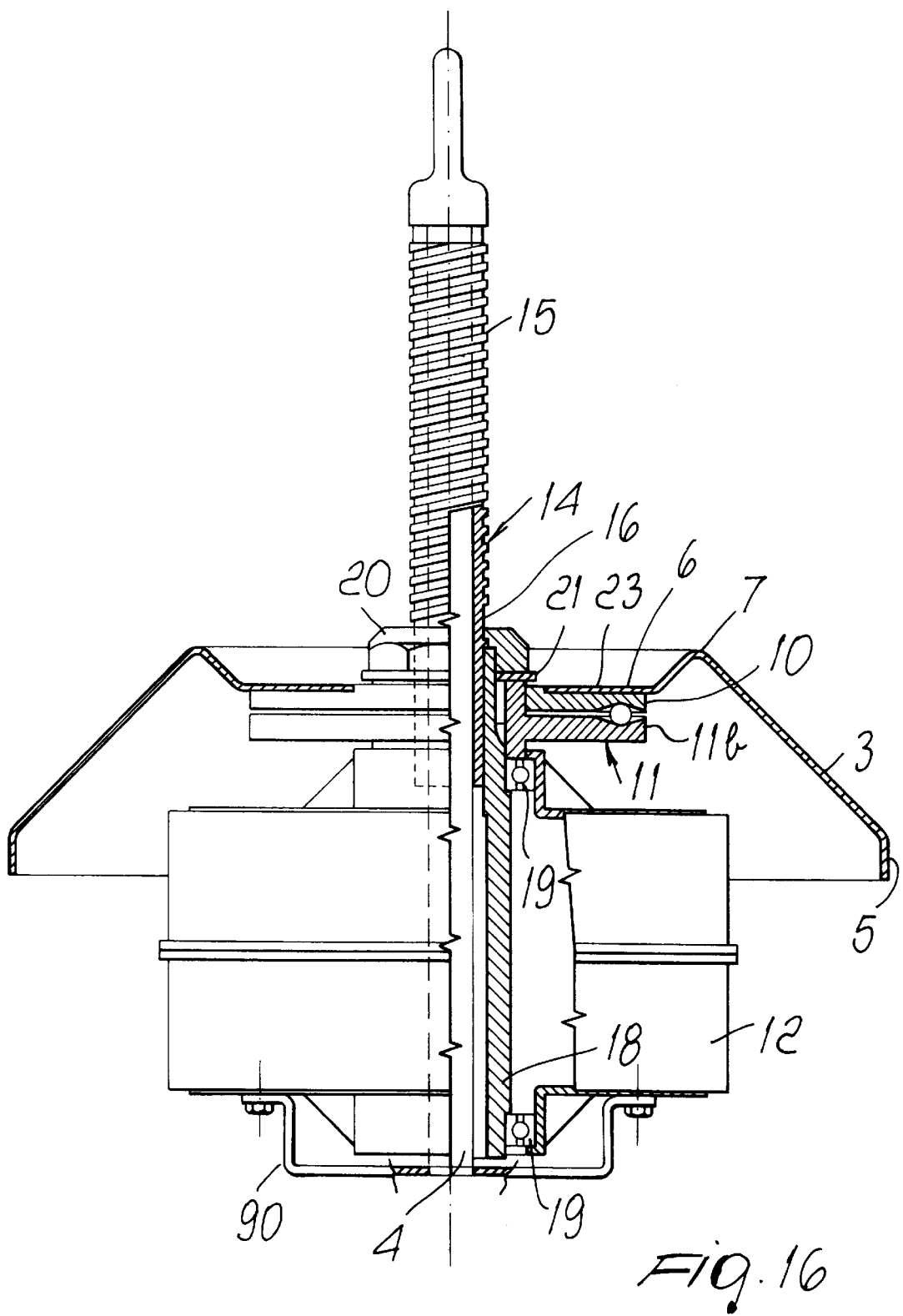
FIG. 16 is a partial sectional view of a conical platform with a respective driving motor and a fixed secondary shaft.

Thus, for example, as shown in FIG. 16, the secondary shaft 4 can be fixed, as described earlier, in which case it can be fixed in any suitable manner to a bracket 90 which is bolted to the lower part of the casing of the motor 12. However, the secondary shaft 4 can also be mounted for rotation inside the main shaft 14 and have, at its lower end, a gear 91 which is keyed thereon, as shown in the variation of FIG. 17.

In this case, the casing of the motor 12 supports a fixed auxiliary shaft 92 that is parallel to the shaft 4 and on which two gears, a small one 93 and a larger one 94, are rotatably mounted rigid in rotation with one another. The gear 94 meshes with a pinion 95 which is keyed to the lower end of the output shaft 18 of the motor 12, whilst the small gear 93 meshes with the gear 91. Owing to this operating connection between the secondary shaft 4 and the driving shaft 18, the secondary shaft is rotated in the same direction as the driving shaft, but more slowly and thus with greater power.

If an idler gear is provided between the gears 91 and 93 or between the pinion 95 and the gear 92, the secondary shaft 4 is rotated in the opposite direction with respect to the driving shaft 18, but with a power reduction.

What is claimed is:

1. A tire changing machine comprising:

a support bed;

an at least partly frustoconical platform which is rotatable arranged on the bed to act as a support for a vehicle wheel rim;

a main threaded shaft which is mounted for rotation coaxially with the platform and vertically extend therefrom;

driving means for the rotation of the main shaft;

holding means to be engaged on the main shaft for holding the wheel rim on the platform such that the wheel rim rotates together with said platform when said platform rotates on the bed;

at least one lateral supporting column extending upwards from said bed and pivoted thereto about a substantially horizontal axis to perform controlled angular pitching movements towards, and away from, said platform, the column being extendable and retractable to be positioned between a lowered active position at a desired level with respect to said platform, and a raised resting position;

driving means for controlling the angular movements of said lateral column;

upper bead breaking means supported by said at least one lateral column so as to be adjustable in position with respect to said platform and to act from above on a tire to be mounted on, or removed from, a wheel rim located on the platform;

lower bead breaking means located within said bed and arranged to be lifted against a tire placed on the wheel rim located on the platform; and driving means designed to control the movements of said lower bead breaking means.

2. A tire changing machine according to claim 1, comprising means for retaining, upon control, the said at least one lateral supporting post in a predetermined pitching position.

3. A tire changing machine according to claim 1, comprising an arm that can be telescopically elongated and retracted and is supported in a cantilevered manner by said at least one lateral column, at least one substantially frustoconical bead breaking roller which is mounted free to rotate about an axis which radially extends with respect to said platform to act from above on a tire to be mounted on, or removed from, a wheel rim located on said frustoconical platform.

4. A tire changing machine according to claim 3, comprising a cross-member which is supported at the end of said cantilevered telescopic arm, two bead breaking rollers mounted on said cross-member free to rotate about a respective axis extending radially with respect to said platform in order to act in step from above on a tire to be mounted on, or removed from, a wheel rim placed on said at least partially frustoconical platform.

5. A tire changing machine according to claim 3, comprising a locking ring having a wedge-shaped portion and arranged between two telescopic portions of said cantilevered arm for being inserted between, and extraction from, said telescopic portions.

6. A tire changing machine according to claim 5, comprising driving means for performing, upon control, locking insertion or extraction of said locking ring.

7. A tire changing machine according to claim 3, wherein said at least one lateral column is telescopic and comprises a lower sleeve which is pivoted to said bed about said substantially horizontal axis, an upper sleeve slidingly engaging with said lower sleeve, and resilient loading means between said lower sleeve and said upper sleeve to make it possible manual lowering to said working position and automatic return to said resting position.

8. A tire changing machine according to claim 7, wherein said extendable and retractable arm supported in a cantilevered manner by said at least one lateral column is rotatably supported on said upper sleeve to perform side swinging movements for said at least one upper bead breaking roller.

9. A tire changing machine according to claim 8, comprising resilient loading means for automatic side swinging movement during the final step of the automatic extension towards its resting position of said cantilevered arm on said lateral column.

10. A tire changing machine according to claim 9, wherein said resilient swinging means comprise a springloaded control rod supported by said lateral column and a chain having one end anchored to said cantilevered arm.

11. A tire changing machine according to claim 9, comprising holding means for yieldingly keeping said cantilevered arm in its resting position away from said platform.

12. A tire changing machine according to claim 1, wherein said substantially horizontal pivoting axis of said at least one lateral column is located at a lower level than said platform, thereby allowing said lateral column to effect angular movements on a substantially radial plane with respect to said platform to cause the said upper bead breaking means to take an inclined position between the edge of the wheel rim and a tire bead.

13. A tire changing machine according to claim 12, comprising locking means for securing said lateral column in a given inclined position with respect to the said platform.

14. A tire changing machine according to claim 1, wherein said lower bead breaking means comprises a post arranged to be raised to a working position and lowered to an resting position inside the bed along a preset path, and at least one substantially frustoconical roller which is mounted at the top of said post and is free to rotate about a radial axis with respect to said platform.

15. A tire changing machine according to claim 14, comprising a cross-member which is articulated to the top end of said post, two bead breaking rollers which are mounted on said cross-member free to rotate about a respective axis which extends radially with respect to said platform in order to act in step from below on a tire to be mounted on, or removed from, a wheel rim placed on said platform.

16. A tire changing machine according to claim 15, comprising resilient pusher means having a center of thrust spaced from the axis of rotation of said platform thereby generating a moment designed to cause said lower bead breaking rollers to automatically follow the taper of said platform and to assist in automatically overrunning the lower edge of a wheel rim placed on said platform.

17. A tire changing machine according to claim 16, wherein each one of said lower bead breaking rollers comprises a hub made of a material having a low friction coefficient and a length which allows the free edge of the respective roller to surmount, during use, without colliding therewith, the edge of a wheel that rests on said platform during the lifting of said vertically adjustable post.

18. A tire changing machine according to claim 14, wherein said actuation means for actuating the angular movements of said lateral column and said actuation means for said lower bead breaking means comprises a single linear actuator unit, one end of which is articulated to the lower end of said at least one lateral column, the other end being kinematically connected to said vertically adjustable column.

19. A tire changing machine according to claim 18, wherein said linear actuator comprises a fluid-driven cylinder and piston unit.

20. A tire changing machine according to claim 19, wherein kinematic connection between the linear actuator and the vertically adjustable column comprises an articulation lever and means for resilient loading between the lever and the column.

21. A tire changing machine according to claim 1, comprising locking and releasing means for engaging said platform with, and releasing from, the wheel rim, arranged to sequentially cause a relatively small approach movement of said platform with respect to said wheel rim in order to lock the wheel rim against the platform during at least part of a tire mounting or removal operation and a get away movement in order to release the wheel rim.

22. A tire changing machine comprising:
a supporting bed;
an at least partially frustoconical platform which is arranged on the bed and designed to act as support for a vehicle wheel rim;
a main threaded shaft which is mounted for rotation coaxially with the platform from which it extends vertically upwards;
driving means for the rotation of the main shaft;
means for retaining the Wheel rim on the platform, which can be screwed onto the maw shaft;
at least one lateral supporting column which raises from the said bed;
upper bead breaking, means supported by said at least one lateral column so as to be adjustable in position with respect to the platform and to be able to act from above on a tire to be mounted on, or removed from, the wheel rim placed on the platform;

lower bead breaking means arranged within said bed and designed to be lifted against a tire placed on the wheel rim placed on the platform;

actuation means for the said lower bead breaking means; and means for locking and releasing the said platform with respect to the wheel rim, arranged, sequentially to control a relatively small mutual approaching movement between the said platform and said wheel rim, thereby locking the wheel rim against the platform during at least part of a tire mounting or removing operation, and a relative getting away movement for releasing the wheel rim.

23. A tire changing machine according to claim 22, wherein the said locking and releasing means comprises:

at least one supporting element for said platform;

at least one reversible driving unit which is arranged to be actuated upon control; and a transmission mechanism for transmitting motion between said driving unit and said platform, that is designed to cause relative approaching or away movements of said platform and said wheel rim at the beginning of the operation of the said driving unit and a relative getting away movement at the end of the operation of said driving unit.

24. A tire changing machine according to claim 23, wherein said at least one reversible driving unit comprises a double-acting cylinder and piston unit and said motion transmission mechanism comprises an L-shaped lever which is pivoted to a fixed support and has one end articulated to the cylinder and piston unit and its other end articulated to the platform or to a platform supporting element.

25. A tire changing machine according to claim 22, wherein said locking and releasing means comprises:

a bearing element for the said at least partly frustoconical platform, which is fixed thereto;

a supporting element for said bearing element, which is telescopically and sealingly connected to the said bearing element, thereby delimiting a variable-volume chamber therebetween; and controlled connection, means between said variable-volume chamber and a source of pressurized fluid to feed, upon control, pressurized fluid, thereby causing the said variable-volume chamber to expand and thus pushing the said platform against a wheel rim placed thereon, and discharging, upon control, said pressurized fluid to release said platform from the wheel rim.

26. A tire changing machine according to claim 22, wherein the said main shaft is hollow and wherein a secondary shaft, which runs coaxially inside the main shaft and protrudes from it at the top, and a reversible driving motor for rotating said main shaft and the platform in either direction are provided.

27. A tire changing machine according to claim 26, wherein said locking and releasing means comprises a bearing element for the platform, which is arranged to rotate rigidly therewith, and a support element which is designed to sliding support the said resting element and, rotates together with the said main shaft, and engaging-disengaging means between said resting element and said support element which ate arranged to cause a relative controlled getting away movement between said resting element and said supporting element, thereby forcing said resting element, and therefore said platform, against a wheel rim placed thereon and making it rigid in rotation with said main shaft at the beginning of each rotation operation owing to the accelerating effect, of said reversible motor, and a relative controlled approaching movement of said resting element and said supporting element, thereby releasing said platform from the wheel rim as a result of a braking acceleration of said motor or said supporting element.

28. A tire changing machine according to claim 27, wherein said engaging-disengaging means comprises a plurality of angularly spaced receiving seats formed in at least one of said resting and support elements each seat being delimited by tangentially-extending inclined-plane surfaces, and at least one ball which can freely rotate in each seat.

29. A tire changing machine according to claim 27, wherein said engaging-disengaging means comprises a plurality of fixed angularly spaced balls which are seated in said resting element or in said support element, a sliding engagement seat with inclined-plane walls for each fixed ball, said seat being formed in said supporting element and in said resting element, respectively.

30. A tire changing machine according to claim 27, wherein said engaging-disengaging means comprises a plurality of teeth and mutually opposite inclined-plane surfaces which are provided both in the resting element and in the support element and are designed to mutually slidingly engage with one another.

31. A tire changing machine having:

a supporting bed;

a frustoconical platform which is arranged on the bed and arranged to act as a support for a wheel, rim;

a main hollow and externally threaded shaft which is mounted for rotation coaxially with respect to the platform, from which it extends vertically;

a reversible motor for rotating in either direction said main shaft and said platform;

a secondary shaft which extends coaxially along said main shaft and protrudes from it at the top thereof;

holding means for retailing the wheel rim on said platform, said means being screwable onto the main shaft;

at least one lateral supporting column which raises from said bed;

upper bead breaking means supported by said at least one lateral column to be adjustable in position with respect to the platform and to be able to act from above on a tire to be mounted on, or removed from, a wheel rim placed on the platform;

lower bead breaking means arranged within said bed and. designed to raise against a tire placed on a wheel rim arranged on the platform;

driving and control means for said lower and upper bead breaking means, and locking and releasing means for locking and releasing said platform against a wheel rim placed on it, which are arranged to cause, upon starting the said motor, a relatively small approaching movement between said platform and said wheel rim, thereby locking said wheel rim on the platform, and a getting away movement for releasing the platform from the wheel rim when said motor stops.

32. A tire changing machine according to claim 31, wherein said locking, and releasing means comprises a resting element for the platform, which is rigid in rotation with the said main shaft, and engagement-disengagement means provided between said resting element and said supporting element and arranged to cause a Controlled relative getting away movement between said resting element and said supporting element, thereby forcing said resting element, and thus said platform, against the wheel rim placed thereon to make it rigid in rotation with said main shaft owing to acceleration effect at the beginning of each rotation movement of said reversible motor, and a controlled relative approaching movement of said resting element and said supporting element to release said platform from the wheel rim as a consequence of a braking acceleration of said motor or of said supporting element.

33. A tire changing machine according to claim 32, wherein said engagement-disengagement means comprises a plurality of angularly spaced receiving seats formed in at least one said resting element and said supporting element and each delimited by inclined-plane surfaces which extend in a tangential direction, and at least one ball free to rotate in each seat.

34. A tire changing machine according to claim 32, wherein said engagement-disengagement means comprises a plurality of fixed angularly spaced balls which are seated in either said resting element or said supporting element, a sliding engagement seat with inclined-plane walls for each fixed ball, said seat being formed in said supporting element or in said resting element, respectively.

35. A tire changing machine according to claim 32, wherein said engagement-disengagement means comprises a plurality of teeth opposed to inclined-plane surfaces formed in the resting element and in the supporting element and arranged to slidingly engage with one another.

36. A tire changing machine according to claim 31, wherein said driving and control means comprises a double acting cylinder and piston unit and a transmission mechanism between said cylinder and piston unit and said lower bead breaking means, which has an L-shaped lever which is pivoted to a fixed support and has one end thereof articulated to the cylinder and piston unit and its other end articulated to the platform or to a supporting element of the platform.

37. A tire changing machine according to claim 36, wherein said control and actuation means comprises a control pedal having a longer lower arm pivoted to said bed and a shorter upper arm pivoted to the lower arm, resilient return means between said lower arm and the bed, and a pair of control valves which are controlled by the upper arm and by the lower arm respectively.

38. A tire changing machine according to claim 31, wherein said locking and releasing means comprises:

a resting element for said at least partly frustoconical platform to which it is fixed;

a supporting element for said resting element, which is telescopically and sealingly connected to said resting element, thereby delimiting a variable-volume chamber therebetween; and connecting means for controlled connection of the variable-volume chamber to a source of pressurized fluid to feed, upon control, pressurized fluid thereto, thereby causing the said variable-volume chamber to expand and thus the said platform to be thrusted against a wheel rim arranged thereon, and discharging, upon control, said pressurized fluid therefrom to release said platform from the wheel rim.

39. A tire changing machine according to claim 31, wherein said at least one lateral supporting column is pivoted about a substantially horizontal axis, thereby performing controlled angular pitching movements towards and away from said platform, and is vertically extendable and retractable to be arranged between a lowered active position, at a chosen level with respect to said platform, and a raised resting position.

40. A tire changing machine according to claim 39, comprising a telescopically extendable and retractable arm which is supported in a cantilevered manner by said at least one lateral column, at least one substantially frustoconical bead breaking roller which is idly mounted about an axis radially extending with respect to the said platform to act from above on a tire to be mounted on, or removed from, a wheel rim placed on the said frustoconical platform.

41. A tire changing machine according to claim 40, comprising a cross-member supported by the said telescopic cantilever arm, a pair of bead breaking rollers mounted on said cross-member free to rotate about a respective axis extending radially with respect to said platform to act in step from above on a tire to be mounted on, or removed from, a wheel rim placed on said at least partly frustoconical platform.

42. A tire changing machine according to claim 40, comprising a locking ring having a wedge-shaped portion and arranged between two telescopic sections of said telescopically extendable and retractable cantilever arm for its engagement with said telescopic sections.

43. A tire changing machine according to claim 42, comprising driving means for performing, upon control, the locking engagement or release of said locking ring.

44. A tire changing machine according to claim 39, wherein said at least one lateral column is telescopic and comprises a lower sleeve portion which is pivoted to said bed about said substantially horizontal axis, an upper sleeve portion slidingly engaging with said lower sleeve portion, and resilient loading means between said lower sleeve and said upper sleeve, thereby allowing manual lowering of said upper sleeve and thus of said telescopic arm in said working position and automatic return to said resting position.

45. A tire changing machine according to claim 44, wherein said extendable and retractable arm supported in a cantilevered manner by said lateral column is rotatably supported on said upper sleeve, thereby allowing said at least one upper bead breaking roller to perform horizontal swinging movements.

46. A tire changing machine according to claim 45, comprising resilient loading means for automatic swinging away movement towards its resting position of said cantilevered arm during the final step of the automatic extension of said column.

47. A tire changing machine according to claim 46, wherein said resilient means for said swinging movement comprises a spring-loaded actuation rod which is supported by said lateral column and a chain having one end thereof anchored to said rod and its other end connected to said cantilevered arm.

48. A tire changing machine according to claim 46, wherein it comprises holding means for yieldingly keeping said cantilevered arm in its resting position away from said platform.

49. A tire changing machine according to claim 39, wherein said substantially horizontal pivoting axis of said lateral column is located at a lower level than said platform, thereby allowing the said lateral column to perform angular movements in a substantially radial plane with respect to said platform to ensure an inclined arrangement of said upper bead breaking rollers once they have been inserted between the edge of the wheel rim and the bead of the tire.

50. A tire changing machine according to claim 49, comprising blocking means for locking said lateral column in a given inclined position with respect to said platform.

51. A tire changing machine according to claim 31, wherein said lower bead breaking means comprises a post, which can be raised into a working position and lowered to a resting position inside the bed along a preset path, and at least one substantially frustoconical roller mounted at the top of said post free to rotate about an axis which is inclined with respect to said platform.

52. A tire changing machine according to claim 51, comprising a cross-member which is articulated to the top of said post, two bead breaking rollers that are fitted on said cross-member free to rotate about a respective axis which is directed radially with respect to said platform to act in, step from below on a tire to be mounted on, or removed from, a wheel rim placed on said platform.

53. A tire changing machine according to claim 52, wherein each of said lower bead breaking rollers comprises a hub made of a material having a low friction coefficient and having such a length that the free edge of the respective roller overruns and does not abut against, in use, the edge of a wheel rim resting on said platform during lifting movement of said vertically adjustable post.

54. A tire changing machine according to claim 51, comprising resilient pushing means having a center of thrust located away from the axis of rotation of said platform, thereby producing a moment suitable for causing said lower bead breaking rollers to automatically follow the taper of said platform and automatically overrun the lower edge of a wheel rim arranged on said platform.

55. A tire changing machine according to claim 53, wherein said linear actuator comprises a fluid-operated cylinder and piston unit.

56. A tire changing machine according to claim 55, wherein the operative connection between the linear actuator and the vertically adjustable post, comprises an articulation lever and resilient loading means between the lever and the post.

57. A tire changing machine according to claim 51, wherein said driving means for causing angular movements of said lateral column and said driving means for said lower bead breaking means comprise a single linear driving unit having one end thereof articulated to the lower end of said at least one lateral column and its other end operatively connected to said vertically adjustable post.

58. A tire changing machine according to claim 31, wherein said secondary shaft is fixed.

59. A tire changing machine according to claim 31, wherein said secondary shaft is mounted for rotation within said primary shaft and is operatively connected to said motor to rotate with respect to said main shaft.

60. A tire changing machine according to claim 31, characterized in that said secondary shaft extends upwards from said main hollow shaft and protrudes therefrom with a flattened top portion engageable by a tire tool.

61. A tire changing machine according to claim 31, wherein said motor has a hollow output shaft and said main shaft comprises an upper portion provided with an external thread and a lower portion insertable in said hollow output shaft and provided with a flange for abutment against it.

62. A tire changing machine according to claim 31, comprising a ring nut for fixing said main shaft in position in said output shaft, said ring nut being screwable onto said output shaft and abutting against said flange.

63. A tire changing machine according to claim 31, wherein said frustoconical platform comprises, at the top thereof, a frustoconical ring made of flexible material for supporting the central part of a wheel rim.

64. A tire changing machine according to claim 31, wherein said outer frustoconical portion of the platform is covered with and protected by a covering made of soft material.

65. A tire changing machine according to claim 31, comprising an annular tubular element which is supported by said bed and arranged to act both as a component for strengthening the bed and as a compressed air reservoir provided with an automatic filling valve designed to be connected to a suitable source of compressed air, and with at least one feeding valve.

66. A tire changing machine according to claim 31, comprising an auxiliary lateral turret which is fixed in a lower portion of said bed and has, at the top thereof, a sleeve which is supported for rotation about a substantially vertical axis and rigidly secured to one end of a cantilevered arm, the other end of which supports a vertical tubular guide inside which a tool supporting rod is slidably mounted in contrast with resilient loading means, and a mounting-removing tool which is carried at the lower end of said tool supporting rod.

* * * * *